United States Patent
Fukuhara et al.

(10) Patent No.: US 7,454,075 B2
(45) Date of Patent: Nov. 18, 2008

(54) BLOCK AREA WAVELET TRANSFORM PICTURE ENCODING APPARATUS

(75) Inventors: Takahiro Fukuhara, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 11/190,372

(22) Filed: Jul. 26, 2005

(65) Prior Publication Data

US 2005/0259880 A1 Nov. 24, 2005

Related U.S. Application Data

(62) Division of application No. 09/803,404, filed on Mar. 9, 2001, now Pat. No. 7,016,546.

(30) Foreign Application Priority Data

Mar. 10, 2000 (JP) ............................ P2000-072515
May 26, 2000 (JP) ............................ P2000-157117

(51) Int. Cl.
*G06K 9/36* (2006.01)
(52) U.S. Cl. ..................................... 382/240
(58) Field of Classification Search ................. 382/232, 382/240
See application file for complete search history.

(56) References Cited

U.S. PATENT DOCUMENTS

| 5,881,176 A | 3/1999 | Keith et al. |
| 5,926,791 A | 7/1999 | Ogata et al. |
| 5,949,911 A * | 9/1999 | Chui et al. ................... 382/240 |
| 6,111,991 A | 8/2000 | Ribas-Corbera et al. |
| 6,201,897 B1 | 3/2001 | Nixon |
| 6,208,761 B1 * | 3/2001 | Passaggio et al. ........... 382/237 |
| 6,229,926 B1 | 5/2001 | Chui et al. |
| 6,263,022 B1 * | 7/2001 | Chen et al. ............. 375/240.03 |
| 6,546,143 B1 * | 4/2003 | Taubman et al. ............ 382/240 |
| 6,778,709 B1 * | 8/2004 | Taubman ..................... 382/240 |
| 6,801,665 B1 * | 10/2004 | Atsumi et al. ................ 382/239 |
| 6,891,973 B1 * | 5/2005 | Atsumi et al. ................ 382/232 |
| 2001/0041011 A1 * | 11/2001 | Passaggio et al. ........... 382/232 |

* cited by examiner

*Primary Examiner*—Wenpeng Chen
(74) *Attorney, Agent, or Firm*—Finnegan, Henderson, Farabow, Garrett & Dunner, L.L.P.

(57) ABSTRACT

In wavelet transform encoding, high-quality encoding is to be realized by enabling picture quality control from one fractional area to another. An input picture 100 is read out in an amount corresponding to a number of lines required for wavelet transform and buffered in a memory unit 6. The input picture then is wavelet transformed in a wavelet transform unit 2 and quantized in a coefficient quantizing unit 3. In quantizing wavelet transform coefficients, the wavelet transform coefficients are multiplied by weighting coefficients from one sub-band to another. The weighting coefficients are determined using the analysis information of a specified block area in a picture, such as motion information and texture fineness information. This enables fine quantization control in terms of a picture block as a unit.

12 Claims, 22 Drawing Sheets

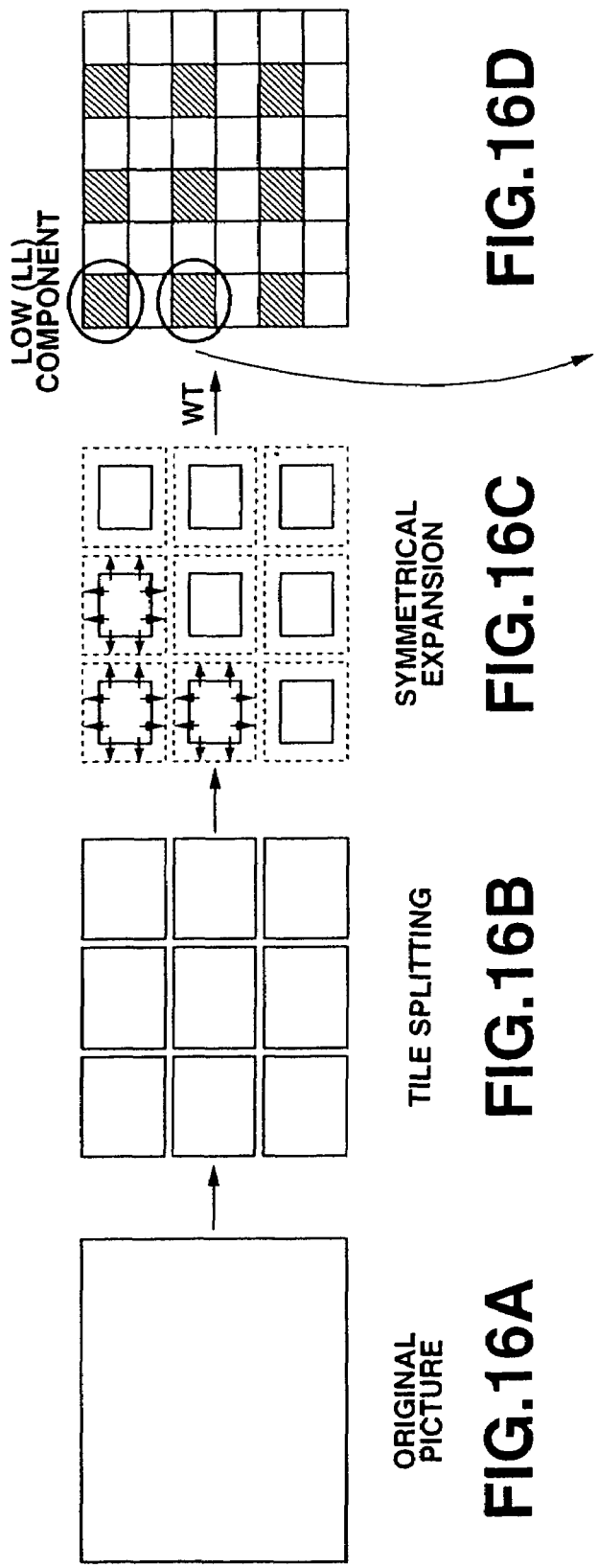
FIG.16A ORIGINAL PICTURE
FIG.16B TILE SPLITTING
FIG.16C SYMMETRICAL EXPANSION
FIG.16D LOW (LL) COMPONENT
FIG.16E
FIG.16F

W IS ENTROPY
ENCODING UNIT

BLOCK AREA WAVELET TRANSFORM PICTURE ENCODING APPARATUS

This application is a divisional of U.S. application Ser. No 09/803,404, filed Mar. 9, 2001, now U.S. Pat. No. 7,016,546, the contents of which are hereby incorporated in their entirety.

BACKGROUND OF THE INVENTION

1. Field of the Invention

This invention relates to a picture encoding method and apparatus for encoding a still image or moving pictures using wavelet transform.

2. Description of Related Art

Typical of the conventional representative picture compression systems is the JPEG (Joint Photographic Coding Experts Group) system standardized by ISO (International Organization for Standardization). This JPEG system is a system for compressing and encoding mainly a still picture using DCT (discrete cosine transform). This JPEG is known to give acceptable encoded and decoded pictures on the condition that a larger number of bits is allocated. However, if, in this system, the number of encoding bits is diminished to a more or less extent, block distortion peculiar to DCT becomes outstanding to make subjective deterioration apparent.

Recently, such a system comprising splitting the frequency spectrum of a picture into plural bands by a set of filters combined from plural high-pass and low-pass filters, known as a filter bank, and encoding the picture from band to band, is being researched vividly. In particular, the wavelet encoding, which is free from a defect proper to DCT that block distortion becomes apparent at high compression, is thought to be promising as a new technology to take the place of the DCT.

In encoding moving picture, there are currently known the MPEG-1, MPEG-2 and the MPEG-4 of the MPEG (Moving Picture Image Coding Experets Group) system. Of these, the MPEG-2 is widely used for compressing the so-called DVD (Digital Versatile Disc). In the encoding techniques, used in JPEG and MPEG, encoding control is made from one macroblock to another. It is noted that several 8×8 blocks, each of which is a processing unit for DCT, usually 16×16 blocks, make up one macroblock.

At present, the JPEG system, the MPEG system or the so-called DV (digital video) system is used in a majority of video products, such as electronic still cameras or video movies. These encoding techniques, exemplified by JPEG and MPEG, use DCT as the transform system. Since the above products, employing the wavelet transform as basis, are predicted to be presented to the market, researches towards improving the efficiency of the encoding system are conducted briskly in many research laboratories. In actuality, the JPEG2000, a format expected as the next-generation international standard system for a still picture, may be said to be a successor to JPEG, and is being worked out by ISO/IEC/JTC1SC29/WG1, which is of the same organization as that of JPEG. It is scheduled that recommendations for standardization of the part 1 of the JPEG2000 will be issued in March 2001. In this JPEG 2000, it has been decided that wavelet transform is to be used in place of the DCT of the existing JPEG as the transform system as the basis of picture compression.

Meanwhile, if desired to acquire not only an encoded still picture of high quality but also encoded high-quality moving pictures, it is crucial to solve the following problems:

(i) Since the wavelet transform usually executes transform on the entire picture, it is impossible to perform fine control for each specified area in a picture, such as macro-block based control in DCT of the MPEG or JPEG.

(ii) For overcoming the drawback (i) above, there is such a technique in which a picture is divided into tiles or blocks, each being a rectangle, usually a square, of a specified size, and encoding control is performed separately for each tile which is regarded as a picture. The technique has a defect that, (a) if the tile size is decreased, the encoding efficiency is lowered, and that (b) if the compression ratio is raised, discontinuities between neighboring tiles become outstanding to lower the subjective picture quality significantly.

(iii) In wavelet transform encoding, as in DCT encoding, picture quality control is by quantization control. In general, if the quantization step is increased, the number of bits generated is suppressed, however, the picture quality is deteriorated. Conversely, if the quantization step is lowered, the number of bits generated is increased, however, the picture quality is improved. This quantization control needs to be realized in terms of a specified picture area as a unit, irrespective of whether or not the control is to be used as encoding means for tile-based encoding as in (ii) above.

SUMMARY OF THE INVENTION

It is therefore an object of the present invention to provide a method and apparatus in which picture quality control from one partial area to another, that has so far been retained to be difficult, can be realized by a wavelet transform encoder to permit accurate picture quality control to improve the subjective picture quality as well as to allow to cope with both still and moving pictures by a sole encoder.

In one aspect, the present invention provides a picture encoding method comprising a storage step of writing and storing an input picture in memory means from one line to another, a wavelet transform step of applying wavelet transform in the horizontal and vertical directions each time a picture stored in the memory means reaches the number of lines required for wavelet transform, a quantization step of quantizing wavelet transform coefficients obtained from the wavelet transform step; and an entropy encoding step of entropy encoding quantized coefficients from the quantization step when the number of samples of the quantization coefficients has reached the size required for entropy encoding. The quantization step quantizes the wavelet transform coefficients, using at least one of weighting coefficients of a table provided at the outset for each sub-band generated on wavelet transform and weighting coefficients found from one block area picture forming a picture to another.

In another aspect, the present invention provides a picture encoding method comprising a storage step of writing and storing an input picture in memory means from one line to another, a wavelet transform step of applying wavelet transform in the horizontal and vertical directions each time a picture stored in the memory means reaches the number of lines required for wavelet transform, a quantization step of quantizing wavelet transform coefficients obtained from the wavelet transform step, a block picture analysis step of analyzing the motion information in a block picture and the degree of fineness of the texture for each block area in the input picture and an entropy encoding step of entropy encoding quantized coefficients from the quantization step when the number of samples of the quantization coefficients has reached the size required for entropy encoding.

In still another aspect, the present invention provides a picture encoding method comprising a storage step of writing and storing an input picture in memory means from one line to another, a wavelet transform step of applying wavelet transform in the horizontal and vertical directions each time a picture stored in the memory means reaches the number of lines required for wavelet transform, a quantization step of quantizing wavelet transform coefficients obtained from the wavelet transform step and an entropy encoding step of resolving quantization coefficients obtained from the quantization step into bit planes from MSB to LSB, shifting bit planes of a plurality of blocks present in the same sub-band by a pre-set number of bits, and entropy encoding the bit planes of sequentially entropy encoding blocks when the number of samples of the shifted quantization coefficients has reached a pre-set magnitude.

In yet another aspect, the present invention provides a picture encoding method comprising a storage step of writing and storing an input picture in memory means from one line to another, a wavelet transform step of applying wavelet transform in the horizontal and vertical directions each time a picture stored in the memory means reaches the number of lines required for wavelet transform, a quantization step of quantizing wavelet transform coefficients obtained from the wavelet transform step and an entropy encoding step of resolving quantization coefficients from the quantization step into bit planes from the MSB to the LSB and for entropy encoding the quantization coefficients when the number of samples of the quantization coefficients has reached a pre-set magnitude. The entropy encoding step splits and extracts fractional portions of the bit planes from the MSB to the LSB of a plurality of entropy encoding blocks existing in one and the same sub-band, encodes the extracted fractional bit planes from the MSB to the LSB, and generates the fractional encoded bitstream corresponding to the fractional bit planes.

That is, according to the present invention, a spatial block forming a picture is wavelet transformed, responsive to the analysis information for the spatial block, to generate coefficients in a sub-band, which then are acted on to enable optimum quantizing control. In this manner, picture quality control, retained to be difficult, can be realized by a wavelet transform encoding apparatus.

Moreover, according to the present invention, the quantization coefficients are multiplied by weighting coefficients provided at the outset for respective sub-bands, the respective quantization coefficients are resolved into bit planes, and the sequence of encoding the bit planes from the MSB to the LSB is made variable from one entropy encoding block to another to realize quantization control to enable picture quality control accurately.

In addition, the present invention can be applied to moving picture encoding apparatus adapted for coping with plural frames, so that an inexpensive apparatus may be provided which is able to cope with both still and moving pictures with a sole encoding unit.

BRIEF DESCRIPTION OF THE DRAWINGS

FIGS. 16A, 16B, 16C, 16D, 16E and 16F illustrate the concept of wavelet encoding performing symmetrical convolutional pixel processing.

DESCRIPTION OF THE PREFERRED EMBODIMENTS

Figure 1:
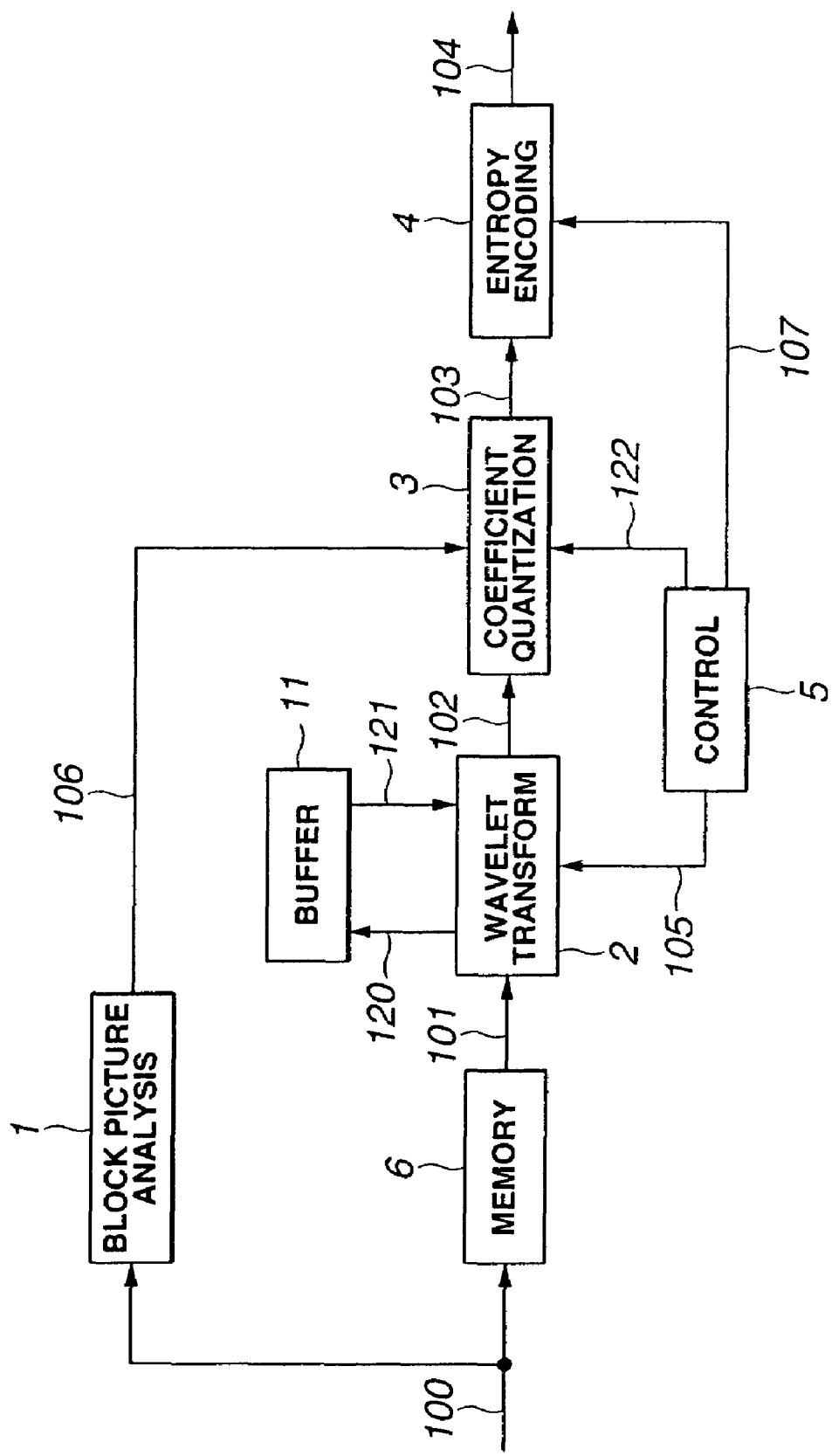
FIG. 1 is a block diagram showing a schematic structure of a picture encoder as a first embodiment of the present invention.

Referring to the drawings, preferred embodiments of the present invention will be explained in detail.

FIG. 1 is a block diagram showing an illustrative structure of a picture encoding device according to a first embodiment of the present invention.

A picture encoding device, shown in FIG. 1, includes a memory 6 for wiring input picture data (input picture) 100 line-by-line for writing and storage therein, a wavelet transform unit 2 for applying wavelet transform in the horizontal and vertical directions each time a picture stored in the memory 6 reaches the number of lines required for wavelet transform, and a coefficient quantizing unit 3 for quantizing wavelet transform coefficients obtained from the wavelet transform unit 2. The picture encoding device also includes an entropy encoding unit 4 for applying entropy encoding when the number of samples of the quantization coefficients obtained from the coefficient quantizing unit 3 has reached a size required for entropy encoding. The coefficient quantizing unit 3 performs quantization using one or both of the weighting coefficients of a table provided at the outset for each sub-band generated at the time of the wavelet transform and weighting coefficients found from one block area picture forming a picture to another. It is noted that the input picture 100 is also fed to a block picture analysis unit 1 adapted for analyzing the motion information in a block picture or the fineness of the texture from one block area picture forming a picture to another. This block picture analysis unit 1 will be explained subsequently in detail.

In the picture encoding device, shown in FIG. 1, an input picture 100 is captured sequentially on the line basis, beginning from the uppermost line, to input the captured picture to a data readout memory 6. At a time point a pre-set amount of picture data corresponding to the number of lines required for wavelet transform has been stored in the memory 6, the wavelet transform unit 2 applies wavelet transform filtering in the horizontal and vertical directions. Usually, the filter used for filtering in the wavelet transform is a filter having plural taps. If the number of lines required for wavelet transform is stored, the wavelet transform filtering can be executed immediately.

FIGS. 2 to 5 illustrate specified processing for wavelet transform, wavelet splitting processing and entropy encoding. The input picture is read and stored from one data line 21 to another, in the memory 6 of FIG. 1 (buffer 22 of FIG. 2), as indicated at step S1. If the number of lines required for vertical filtering in the wavelet transform is stored, as indicated at step S2, the vertical filtering is performed in the wavelet transform unit 2 of FIG. 1. Then, horizontal filtering is performed, as indicated at step S3 in FIG. 3. The wavelet transform coefficients, obtained on wavelet transform, are stored in the buffer 11. At this time point, the values of wavelet transform coefficients of four sub-bands (LL, LH, HL, HH) are already determined. The coefficient quantizing unit 3 of FIG. 1 executes quantization on sub-band coefficients 23 of three sub-bands LH, HL and HH on the high frequency side, shown shaded, as indicated at step S4. At this time, a control signal 122 for executing the quantization is sent from the controller 5 to the coefficient quantizing unit 3. The respective sub-bands (LL, LH, HL and HH) will be explained subsequently with reference to FIG. 6.

On the other hand, wavelet transform coefficients 24 of the lowest sub-band (LL) are again stored in the buffer. This processing is continued until the number of lines as necessary for vertical filtering is stored, as indicated at step S5. So, wavelet transform coefficients 120 from the wavelet transform unit 2 are sent line-by-line to and stored in the buffer 11. On the other hand, quantization coefficients 103 (data of quantized sub-band coefficient lines 25 of FIG. 3), obtained on quantization by the coefficient quantizing unit 3 at step S4, are sent to the entropy encoding unit 4.

If the number of lines required for vertical filtering has been stored in the buffer 11 for the lowest sub-band LL, a control signal 105 for executing the wavelet transform is sent from the controller 5 to the wavelet transform unit 2. For generating the next waveform splitting stage, horizontal filtering is executed next to the vertical filtering, as shown at step S6. As a result, the wavelet transform coefficients values of four sub-bands of the second stage of the lowest sub-band are here determined, as indicated at step S7 in FIG. 4. So, quantization of the subsequent stage is performed immediately to output quantization coefficients.

Figure 2:
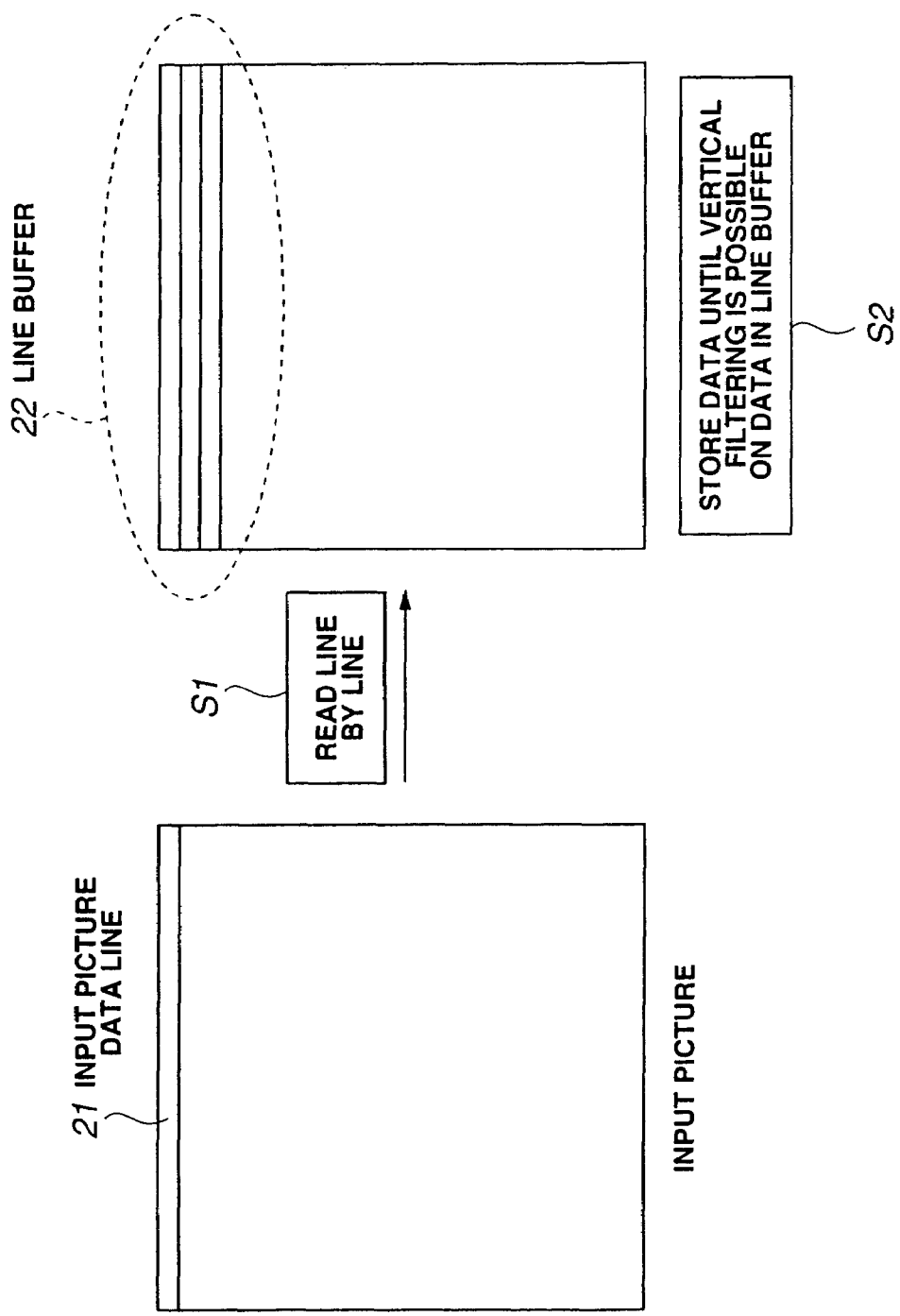
FIG. 2 illustrates the operation of wavelet transform encoding.
Figure 3:
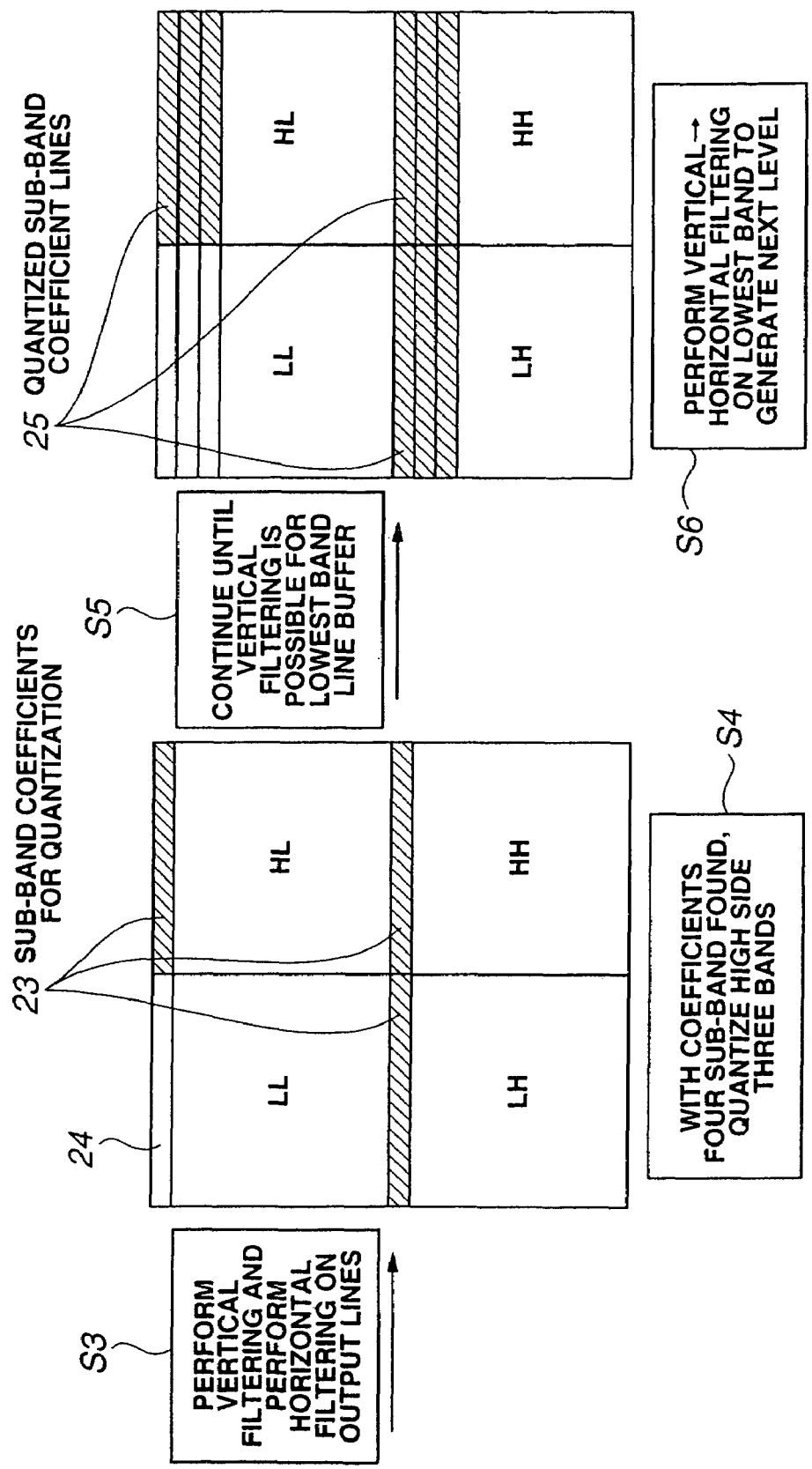
FIG. 3, in continuation to FIG. 2, illustrates the operation of wavelet transform encoding.

If the number of lines required for vertical filtering for wavelet transform in the processing at step S2 of FIG. 2 is to be stored, for a case where the number of split stages is one, or if the number of lines required for vertical filtering in the processing at step S5 of FIG. 3 is to be stored, for a case where the number of split stages is two, the wavelet transform coefficients are stored and held in the buffer 11 of FIG. 1. At this time, the wavelet transform coefficients 120 in each split stage are sequentially sent to and stored in the buffer 11 on the line basis.

On the other hand, in case of vertical filtering in the processing of step S33 or in the processing of step S6 in FIG. 3, the wavelet transform coefficients 121 11 are read out from the buffer 11 in an amount corresponding to the required number of lines stored in the buffer, and are subjected to vertical filtering. The above-described sequence of operations is continued until the processing for the totality of splitting stages come to a close. It is however possible to perform entropy encoding, as now explained, on quantized coefficients for which entropy encoding has become possible partway.

That is, the entropy encoding by the entropy encoding unit 4, located at the trailing end of FIG. 1, is also generally termed an information source encoding, and is a technique for compressing the information volume by exploiting such properties as offset in the distribution of occurrence of data strings. For this entropy encoding, the Huffman encoding and arithmetic coding are used extensively. It is noted that means for performing the encoding as a data string is input and learned is likely to be more favorable in adaptability to the input data than the Huffman encoding employing a pre-set table. In this case, the range in which the input data is to be acquired represents a problem. In general, a larger amount of the input data is more meritorious. However, if desired to limit the processing to a specified area in a picture, input data is acquired within a range of a block-shaped picture of a certain size.

In the present embodiment, any of the above cases can be coped with. However, if entropy encoding is to be performed after holding quantization coefficients of the entire picture, a large size memory or buffer sufficient to hold the entire coefficients is required. So, the entropy encoding of a block base for which a small memory capacity suffices is hereinafter explained.

Figure 4:
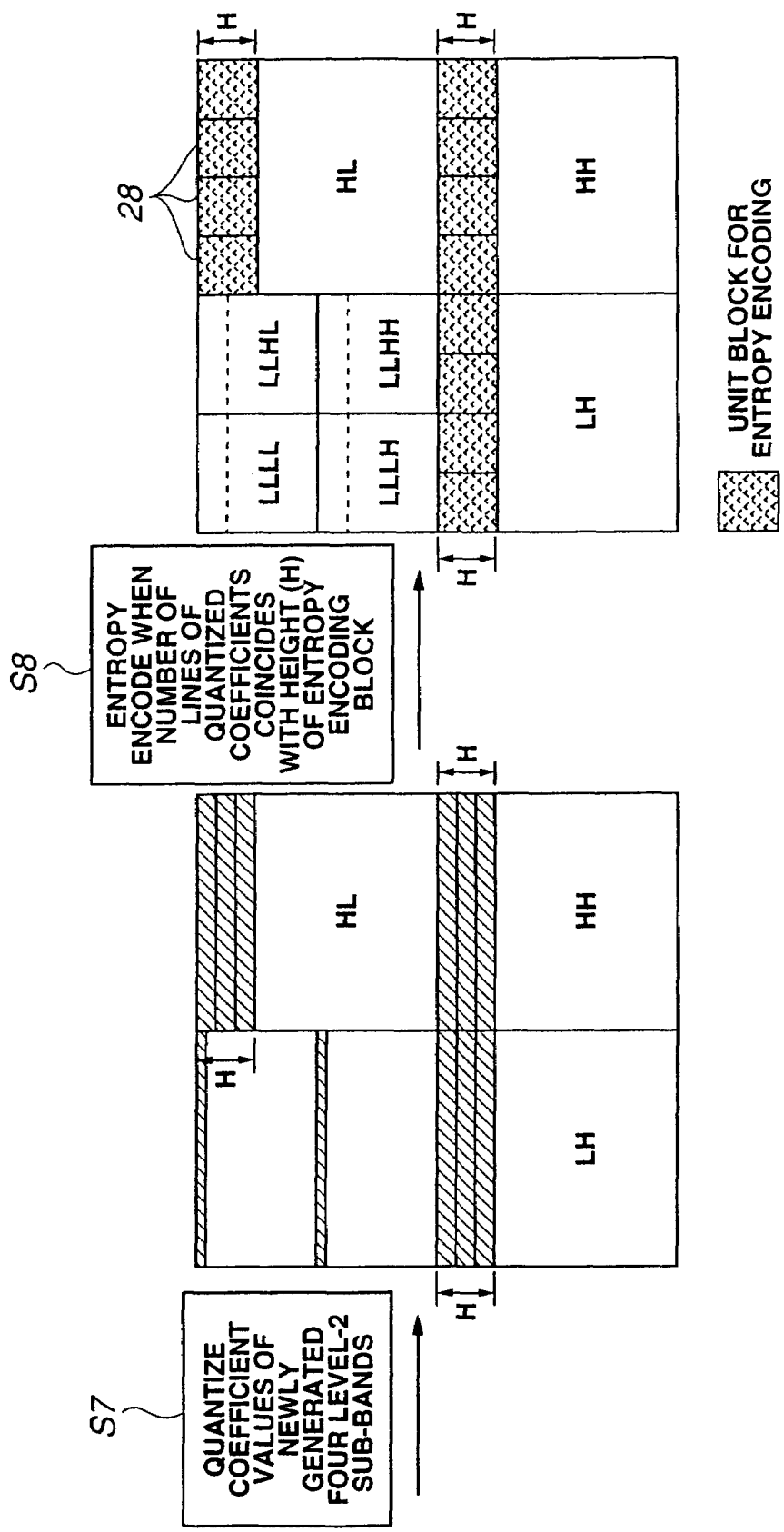
FIG. 4, in continuation to FIG. 3, illustrates the operation of wavelet transform encoding.

When the quantization of the wavelet transform coefficients proceeds by step S4 of FIG. 3 and by step S7 of FIG. 4, until the number of lines of the quantization coefficients of the sub-bands (HL, LH, HH) of the first split stage reaches the height H of the block of the block-based entropy encoding processing unit, the control signal 107 for executing the entropy encoding is sent from the controller 5 to the entropy encoding unit 4 where entropy encoding is executed from one entropy encoding unit 28 to another.

Figure 5:
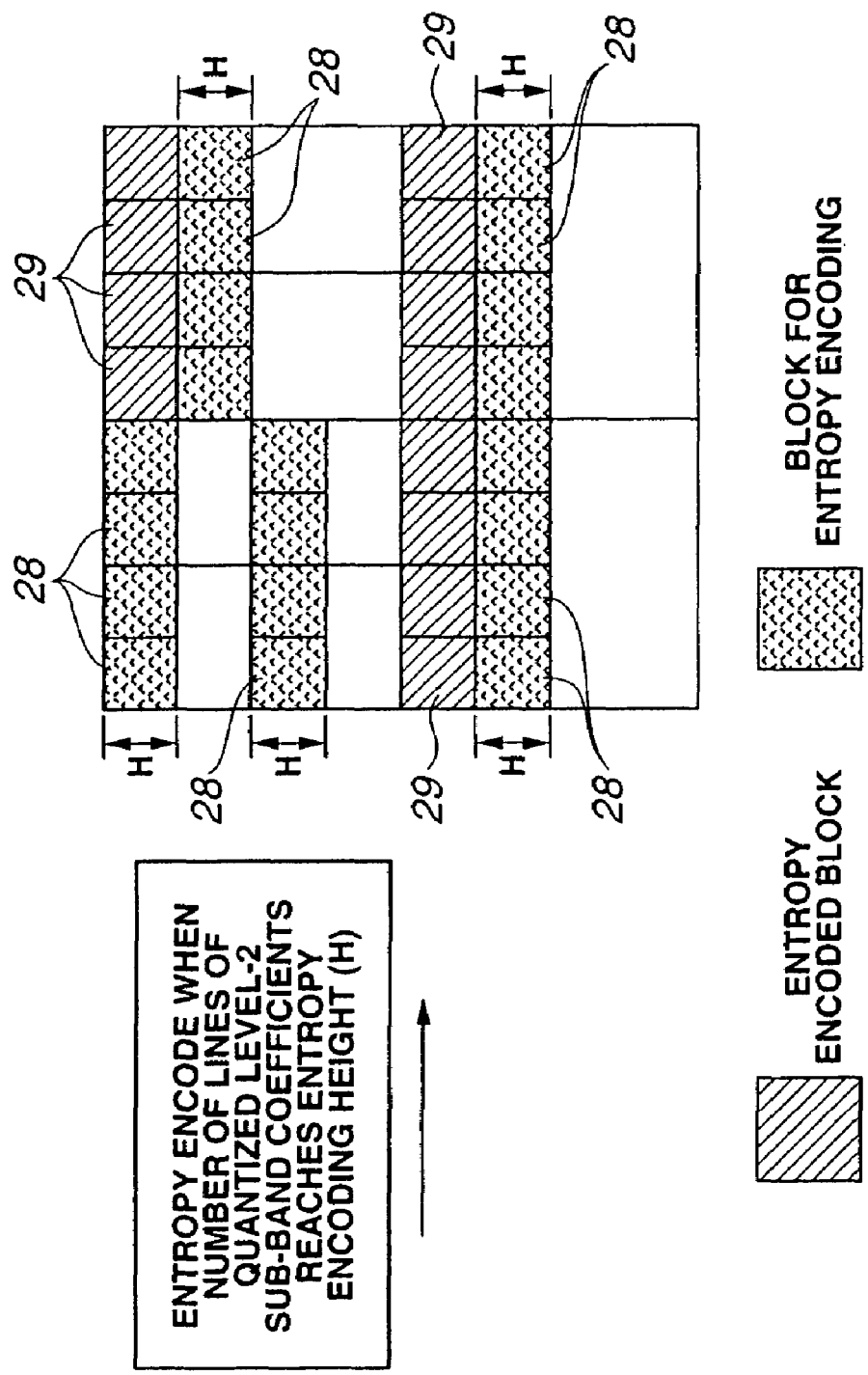
FIG. 5, in continuation to FIG. 4, illustrates the operation of wavelet transform encoding.

In similar manner, when the number of lines of the quantization coefficients of the sub-band LL of the second splittings stage has reached the height H of the block of the entropy encoding processing unit for block-based entropy encoding, as indicated at step S9 of FIG. 5, entropy encoding is executed from one entropy encoding unit 28 to another.

Meanwhile, the block 29 of FIG. 5 indicates a block of quantization coefficients from entropy encoding.

The above processing is repeated up to the wavelet splitting stage as required to complete wavelet transform and quantization plus entropy encoding of the entire picture.

In the first embodiment of the present invention, having the structure and the operation as described above, quantization is executed, using the weighting coefficients provided at the outset from one sub-band generated in the wavelet transform processing to another and/or the weighting coefficients as found from one block area picture forming an entire picture to another. The specified structure and operation of the coefficient quantizing unit 3 of FIG. 1 are hereinafter explained.

In a usual wavelet transform encoder, wavelet transform coefficients are directly quantized, however, the quantized coefficients are multiplied with weighting coefficients to correct the values of the quantized coefficients.

Figure 6:
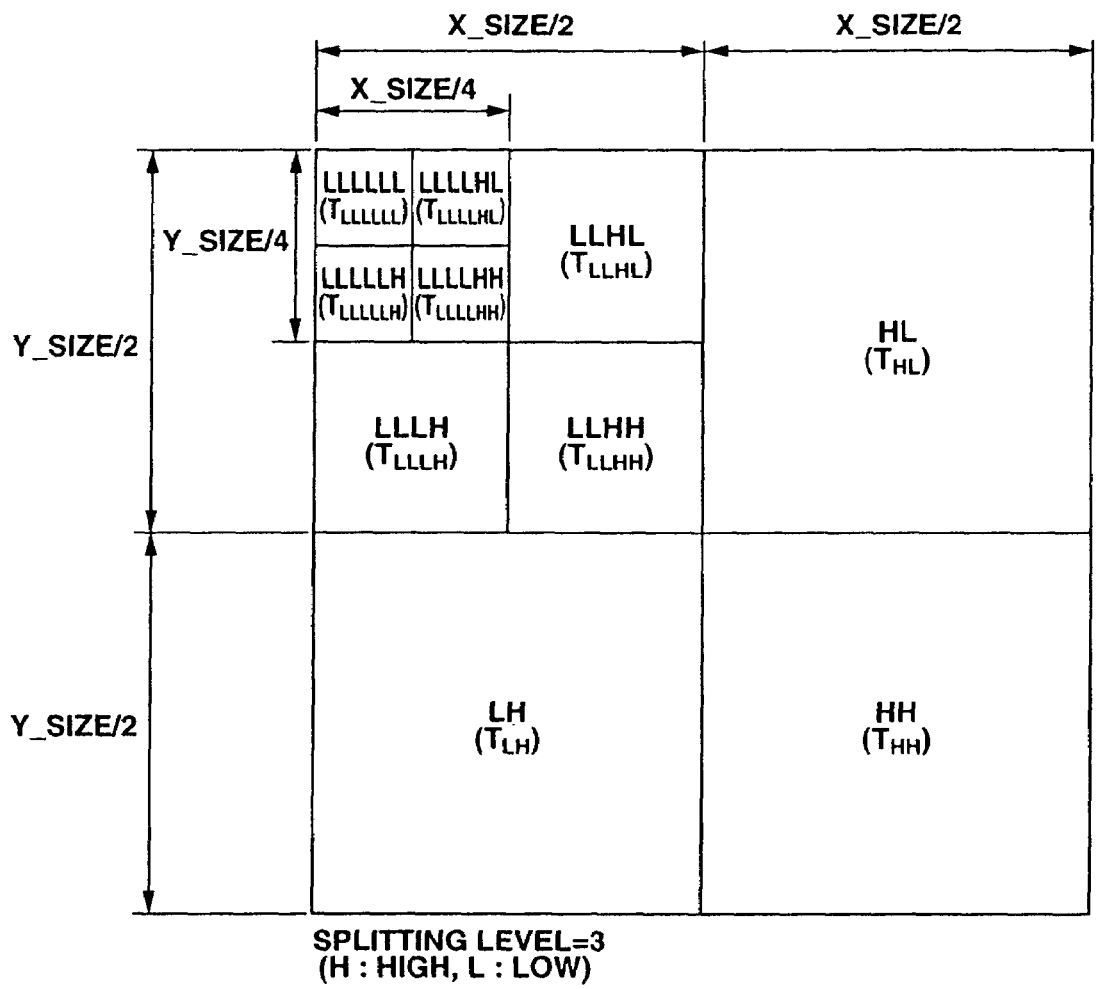
FIG. 6 illustrates the band splitting of a two-dimensional picture, with the splitting level being 3.

For example, there is shown two-dimensional wavelet transform in FIG. 6, where band components obtained as a result of band splitting of a two-dimensional picture up to level 3 are shown. That is, four components LL, LH, HL and HH are obtained by level 1 band splitting in the horizontal and vertical directions, where LL denotes both horizontal and vertical components being L and LH denotes the horizontal and vertical components being L and H, respectively. The LL component is again band-split to form LLLL, LLHL, LLLH and LLHH, whilst the LLLL component is further band-split to form LLLLLL, LLLLHL, LLLLLH and LLLLHH. Instead of hierarchically splitting the band in this manner, the entire band may be split equally. It may be seen that, in the embodiment of FIG. 6, there is obtained a sum total of ten sub-bands by wavelet splitting up to the third level. These ten sub-bands are multiplied by e.g., weighting coefficients T. The weighting coefficients T for respective sub-bands are $T_{LLLLLL}$, $T_{LLLLHL}$, $T_{LLLLHH}$, $T_{LLLLHH}$, $T_{LLHL}$, $T_{LLLH}$, $T_{LLHH}$, $T_{LH}$, $T_{HL}$ and $T_{HH}$, beginning from the coefficient for the low range side LLLLLL component.

That is, the totality of the transform coefficients of the HH component as the level 1 high range band are multiplied by the value of the coefficient $T_{HH}$. Similarly, the transform coefficients of the other ranges of the level 1 are multiplied by the coefficients $T_{LH}$, $T_{HL}$. The LL component is further split into four bands by the splitting of the level 1, so that, in similar manner, the respective transform coefficients are multiplied by weighting coefficients which are predetermined for the respective bands. The above-described operation is executed repeatedly up to a pre-set wavelet splitting level to correct the transform coefficients. In this case, the weighting coefficients may be of different values from one sub-band to another.

Specifically, larger values of the transform coefficients are desirably used as the band goes to lower sides, such as $T_{LLLLLL}$ or $T_{LLHL}$.

Figure 7:
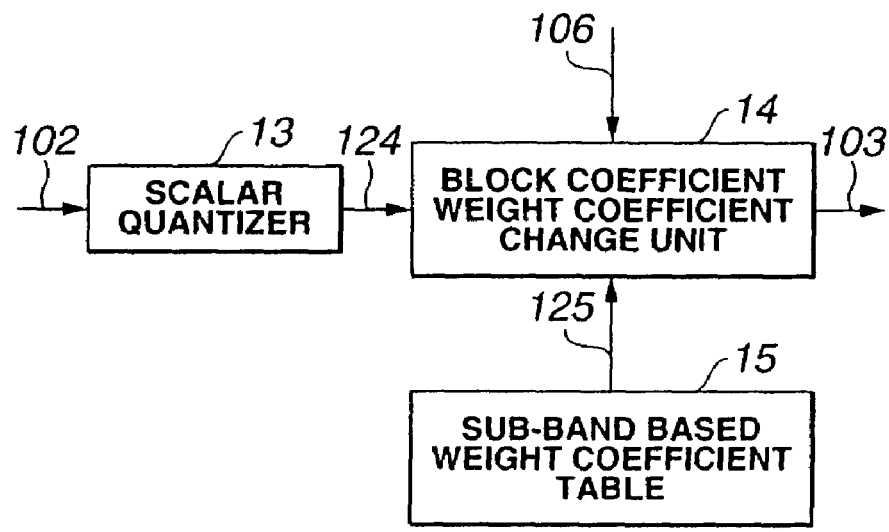
FIG. 7 is a schematic block diagram showing a specified illustrative structure of a coefficient quantizer 3 of FIG. 1.
Figure 8:
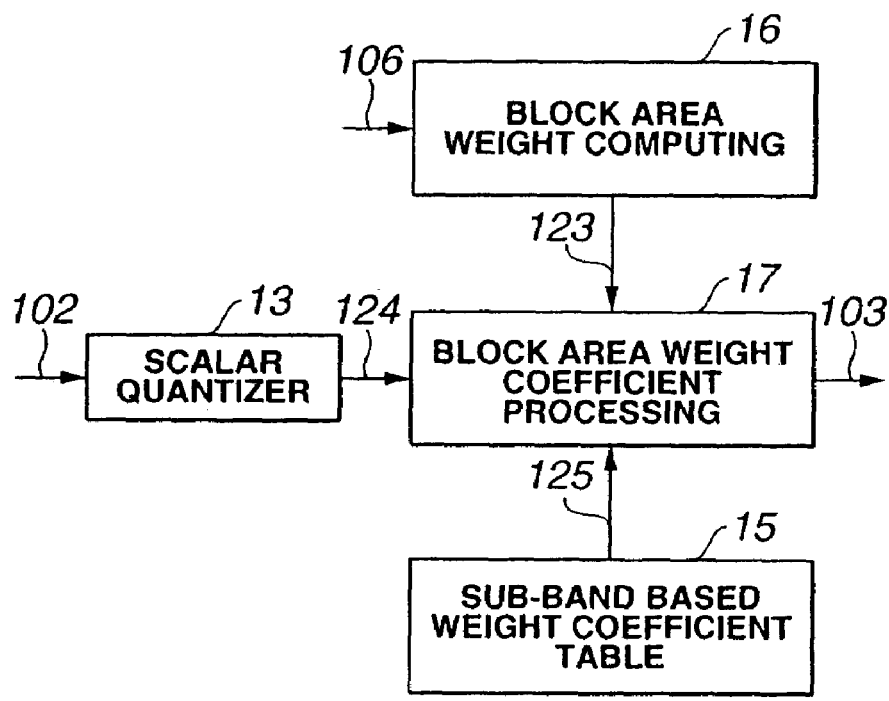
FIG. 8 is a schematic block diagram showing another specified illustrative structure of a coefficient quantizer 3 of FIG. 1.

The technique of managing fine control by multiplying the quantization coefficients with weighting coefficients from one specified block area of the image space to another is now explained. FIGS. 7 and 8 illustrate a specified illustrative structure of the coefficient quantizing unit 3 of FIG. 1.

The coefficient quantizing unit of FIG. 7 includes a scalar quantizing unit 13, fed with wavelet transform coefficients 102 from the wavelet transform unit 2 of FIG. 1, a block area weighting coefficient changing unit 14, fed with scalar-quantized quantization coefficients 124, and a sub-band based weighting coefficient table 15 for routing the sub-band based weighting coefficients 125 to the block area weighting coefficient changing unit 14. This block area weighting coefficient changing unit issues ultimate quantization coefficients 103, as outputs, to the entropy encoding unit 4 of FIG. 1. On the other hand, the analysis information 106, specifying the block area the picture quality for which is desired to be raised, is routed by the block picture analysis unit 1 to the block area weighting coefficient changing unit 14. This block picture analysis will be explained in detail subsequently.

That is, the wavelet transform coefficients 102, generated by the wavelet transform unit 2 of FIG. 1, as described above, are quantized by the scalar quantizing unit 13 as illustrative quantization means, to generate quantization coefficients 124, which are routed to the block area weighting coefficient changing unit 14. On the other hand, the sub-band based weighting coefficient table 15 issues sub-band based weighting coefficients 125, as explained with reference to FIG. 6. These weighting coefficients are set so as to be larger or smaller for larger or smaller values of the numbers of wavelet splitting stages, respectively. On the other hand, the block area weighting coefficient changing unit 14, fed with the block area analysis information, compute the weighting coefficient values for a block area in question to output the changed quantization coefficients 103 to the block area weighting coefficient changing unit 14. As a specified operation, if it is desired to raise the picture quality of a desired block area, the weighting coefficients need to be set to higher values. So, the coefficients of the portion of the sub-band corresponding to such block area are set to larger values based on the sub-band based weighting coefficients 125.

Figure 9:
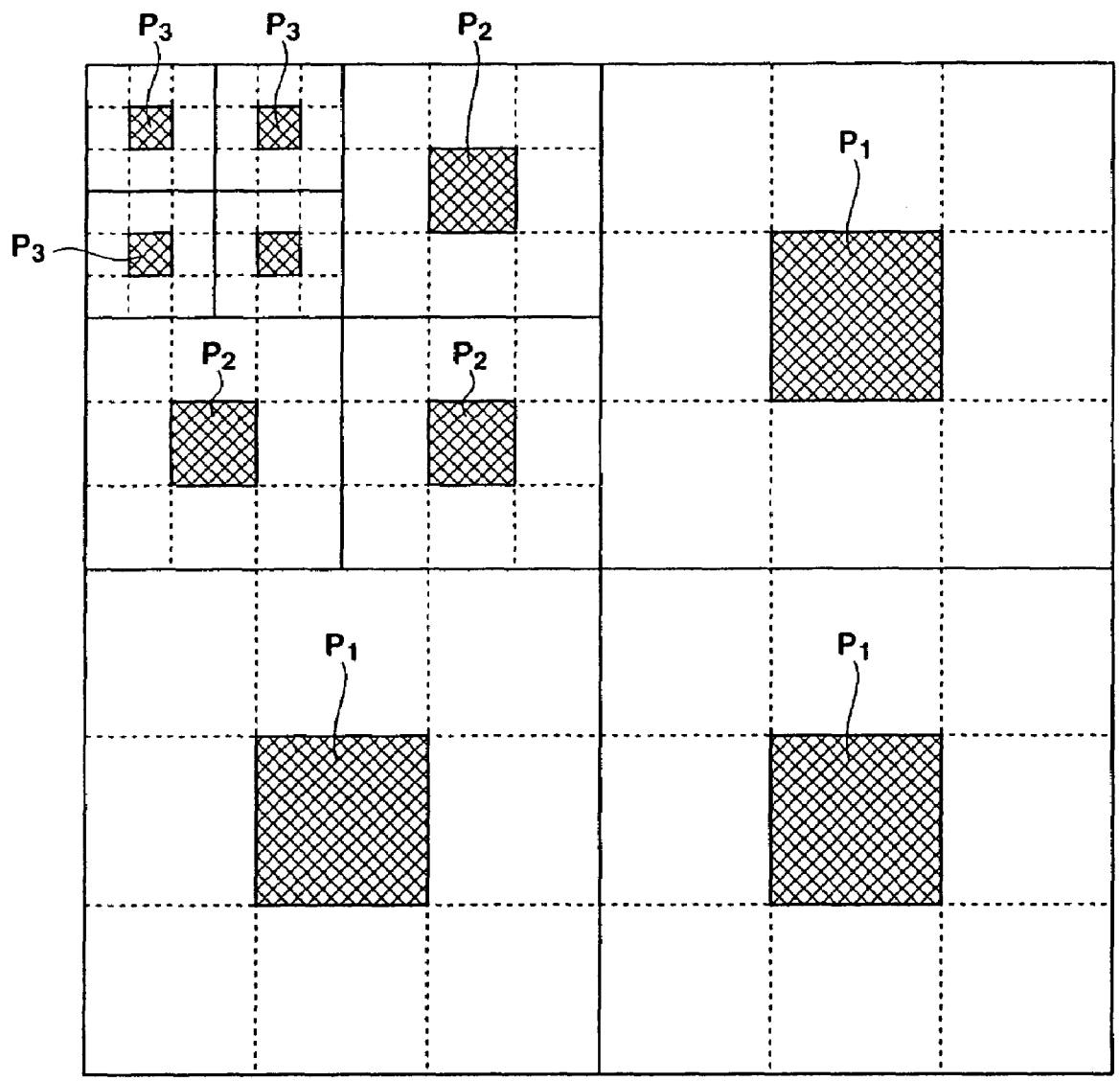
FIG. 9 is a block diagram showing areas of pre-set spatial picture blocks from one sub-band to another.

Assume that the areas corresponding to center blocks, shown netted in FIG. 9, of nine blocks obtained on dividing a picture by 3 in the horizontal direction and by 3 in the vertical direction, is the above-mentioned area desired to be raised in picture quality, as shown in FIG. 9. If this portion is to be raised in picture quality, the rule of using the same weighting coefficient T within one and the same sub-band as shown in FIG. 6 is discounted and, based on this T, the values of the weighting coefficients for the relevant areas (netted portions) are changed. For example, the value of the weighting coefficient for the sub-band component HL is $T_{HL}$, as indicated in FIG. 6. By multiplying the transform coefficient for an area $P_1$ in question in the sub-band component with a weighting coefficient value $T_{HL}$ for the sub-band HL larger than the value for other than the area $P_1$, the weighting coefficient value of the area $P_1$ in the sub-band component HL can be set so as to be larger than that for the other area, so that the picture quality this block area may be improved. The areas $P_1$, $P_2$ and POSITIVE ELECTRODE 3 of the other sub-bands can be processed in an identical manner.

By multiplying the weight value of the block area with a weighting coefficient of the sub-band component, the weighting coefficient of the block area may be determined and multiplied to the scalar quantization coefficient sent from the scalar quantizing unit 13 to determine the ultimate quantization coefficient 103 which is then issued as an output. FIG. 8 shows the structure of this specified embodiment. Referring to FIG. 8, the block area analysis information 106 is routed to the block area weighting coefficient computing unit 16 to find a block area weight 123 which is routed to a block area weight coefficient computing unit 17. The block area weight coefficient computing unit then multiplies the block area weight 123 with the value of the weighting coefficient 125 of the sub-band component from the sub-band based weighting coefficient table 15 to find the weighting coefficient of the block area in question. This weighting coefficient is multiplied to the scalar quantization coefficient 124 sent from the scalar quantizing unit 13 to output an ultimate quantization coefficient 103.

The scalar quantizing unit 13 executes the scalar quantization as shown for example by the following equation 1:

$$Q = x/\Delta \quad (1)$$

to give a scalar quantization output where x and $\Delta$ denote wavelet transform coefficient and the quantization index value, respectively.

The block picture analysis unit 1 and the block area analysis information 106 of FIG. 1 is now explained. The block picture analysis unit 1 of FIG. 1 extracts the information that, in e.g., a block area picture, there is a marked movement of an object or the texture is highly detailed, by analysis means adapted for analyzing the motion information or fineness of the texture from one block area picture to another. Specifically, the results of search in the field of picture processing may be used. In the motion detection, for example, a difference between the current frame and a directly previous frame is found and, if the difference is larger than a pre-set threshold value, it is decided that there is a motion. As for texture fineness, the variance values of the totality of pixel values in a block area picture are sampled and, if the sampled value is larger than a pre-set threshold value, the texture is verified to be detailed.

In the above-described first embodiment, wavelet transform is executed in the order of a vertical filtering and horizontal filtering. This order may, of course, be reversed, provided that the data buffering direction for the horizontal direction is naturally reversed from that for the vertical direction.

Second Embodiment

A second embodiment of the present invention is now explained. In this second embodiment, the entropy encoding unit 4 shown in FIG. 1 is constructed so that the quantization coefficients in a block are arranged into a bit plane composed of binary data, arithmetic encoding is executed depending upon the occurrence probability distribution of the symbols of each sub-bit plane and the probability distribution is estimated only for data in a pre-set block.

Figure 10:
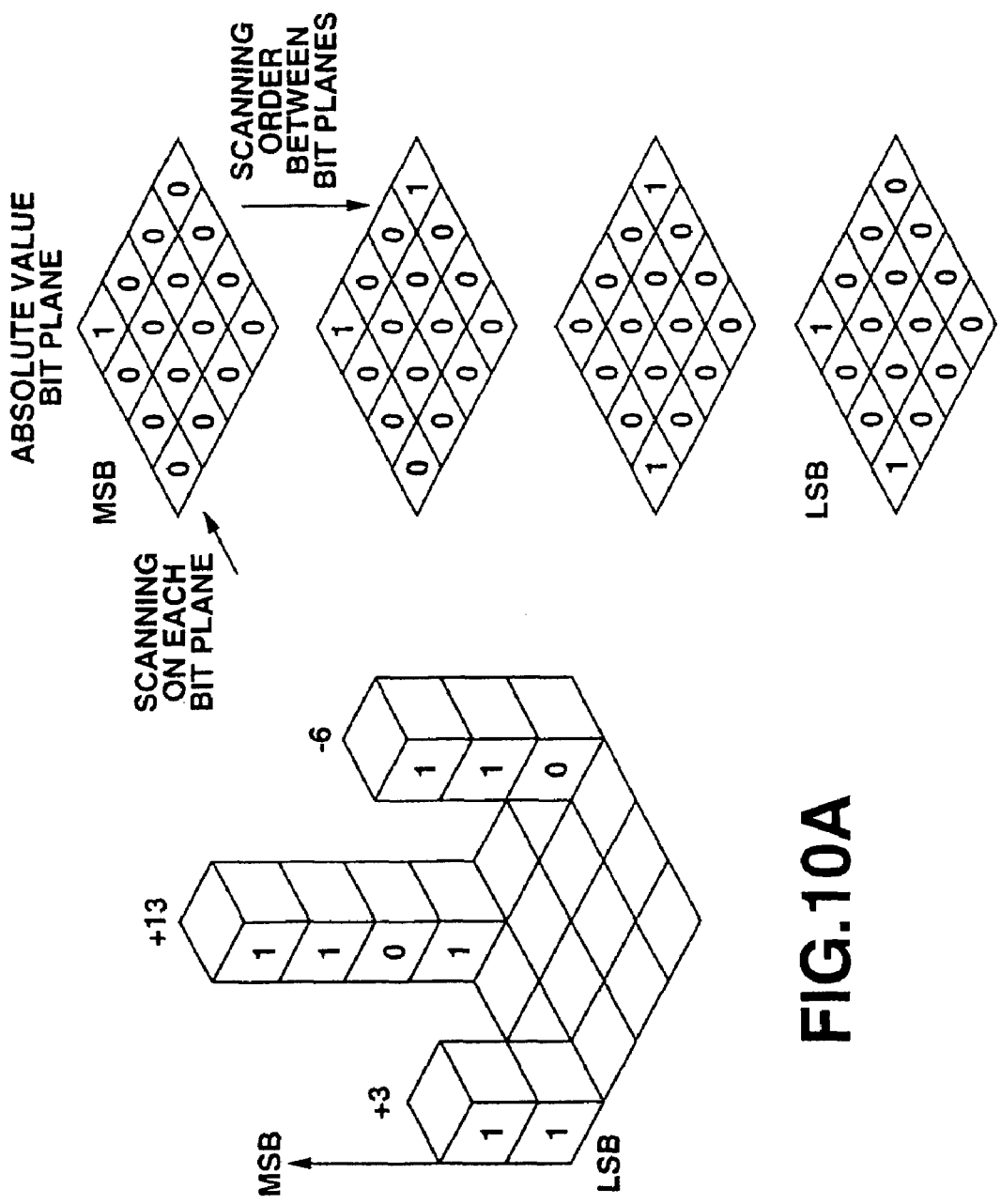
FIGS. 10a, 10b and 10c illustrate coefficients extended in a bit plane.

Referring to FIG. 10, the bit plane is explained with reference to FIGS. 10a to 10c. FIG. 10a shows 4 vertical by 4 horizontal or 16 quantization coefficients, with +13, −6 and so forth indicating post-quantization coefficient values. These quantization coefficients are divided into absolute values and signs of plus and minus, with the absolute values being expanded into a bit plane from the MSB to the LSB. FIGS. 10b and 10c indicate bit planes of the absolute values and a bit plane of signs, respectively. The coefficients on each absolute value bit plane of FIG. 10b are 0 or 1, whilst the coefficients on the sign bit plane in FIG. 10c are +, 0 and −. In FIGS. 10b and 10c, there are shown four absolute value bit planes and one sign bit plane. So, by way of the post-stage processing, it suffices to carry out bit plane based bi-level encoding, such as arithmetic coding. The foregoing is the operation of the entropy encoding unit 4 of FIG. 1.

Meanwhile, the arithmetic coding is the technique of fitting numerical values to encoding symbols as probability distribution estimation is carried out within a pre-set range. This probability distribution estimation is carried out within a range of a pre-set block, as explained with reference to FIG. 4. This maintains independence of entropy encoding.

Third Embodiment

A picture encoding device, as a third embodiment of the present invention, is explained with reference to FIG. 11. The picture encoding device, shown in FIG. 11, is made up of a full picture memory unit 18 for storing the full picture of the input image, a full picture wavelet transform unit 7 for applying the wavelet transform filtering in the horizontal and vertical directions to the entire picture, a block coefficient extraction unit 8 for extracting wavelet transform coefficients corresponding to a specified block area forming a picture, a block coefficient quantizing unit 9 for quantizing the extracted wavelet transform coefficients, and an entropy encoding unit 4 for executing entropy encoding when the number of samples of generated quantization coefficients has reached a pre-set magnitude.

Figure 11:
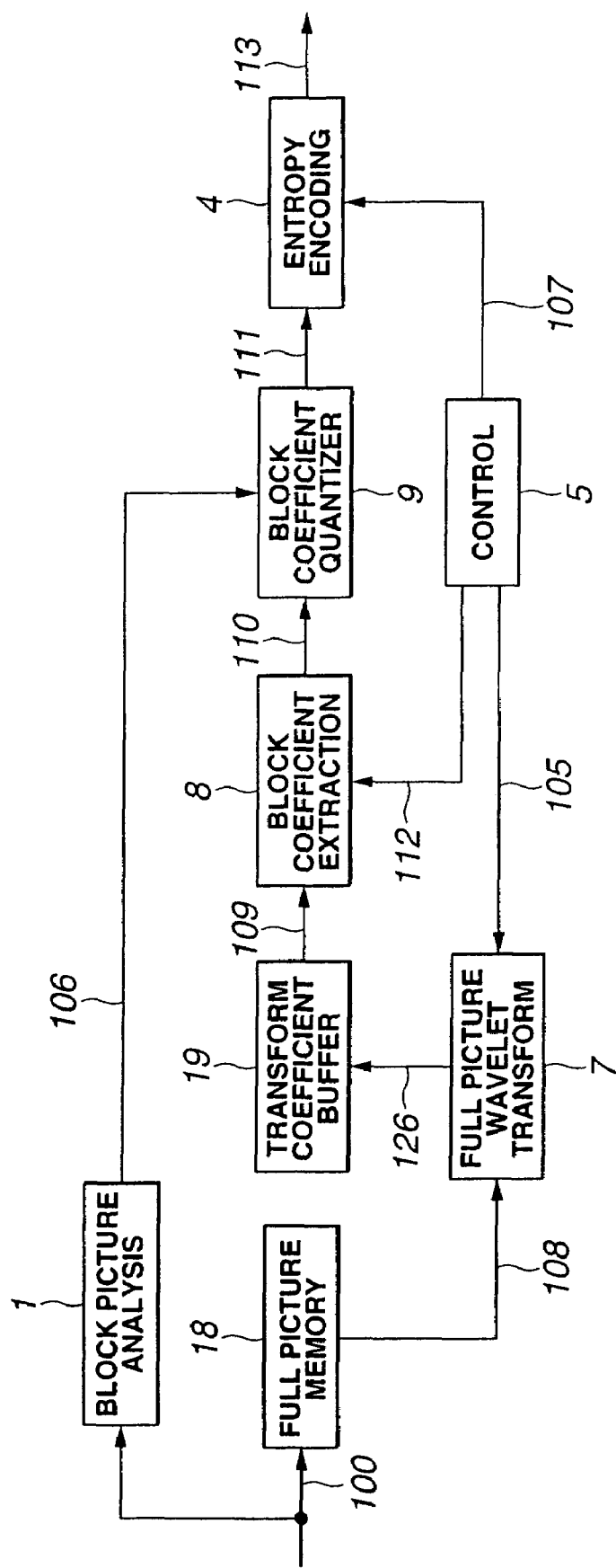
FIG. 11 is a schematic view block diagram showing a schematic structure of a picture encoder as a third embodiment of the present invention.

The first embodiment, already explained, differs from the third embodiment shown in FIG. 11 in that the first embodiment executes wavelet transform line by line, whereas the third embodiment shown in FIG. 11 performs wavelet transform of the entire picture once and performs subsequent processing, such as quantization and entropy encoding, on the block basis.

In FIG. 11, the entire input picture is input to and stored in the memory 18. The full picture wavelet transform unit 7 then performs horizontal and vertical filtering for wavelet transform on the entire picture data 108. Transform is carried out up to the pre-set number of wavelet splitting to generate transform coefficients 126 of the totality of sub-bands. A transform coefficient buffer unit 19 plays the role of a buffer for primarily storing and holding the transform coefficients 126.

In accordance with the control signal 112 from the controller 5, the block coefficient extraction unit 8 extracts and reads out, from the totality of the transform coefficients stored in the transform coefficient buffer unit 19, the transform coefficients 109 of the totality of the sub-bands corresponding to the block area being encoded. The sub-bands of partial areas, shown netted in the drawings, are already explained with reference to FIG. 9. The transform coefficients 110 from the block coefficient extraction unit 8 are then quantized in the block coefficient quantizing unit 9.

As already explained in the first embodiment, the block picture analysis unit 1 sends the analysis information 106 comprehending the motion and texture information for each rectangular block area picture forming a full picture. The block coefficient quantizing unit 9 is responsive thereto to have reference to the analysis information 106 of the current block to be encoded to execute quantization from one block to another. This specified operation has already been explained in the first embodiment with reference to FIGS. 7 and 8. If it is desired to raise the picture quality of a pre-set block picture, it suffices if the weighting coefficients are set to larger values, the sub-band based weighting coefficient table values as explained with reference to FIG. 6 are computed from the so-set values and the resulting computed values are multiplied with the scalar quantization coefficients.

Since the foregoing enables detailed quantization control, from one encoding block to another, the adaptive picture quality control can be realized with advantage.

The quantization coefficients 111 of the block, ultimately obtained by the above processing, are entropy encoded in the entropy encoding unit 4, in accordance with the control signal 5, to produce an encoded bitstream 113, which is issued as output. The entropy encoding employing the bit plane as explained in connection with the second embodiment may also be applied.

In this third embodiment, a picture is buffered and wavelet transformed once and processed with quantization and entropy encoding on the block basis in the subsequent stage, so that picture readout can be done only once with advantage as compared to the case of the first embodiment. However, in the present third embodiment, the buffer capacity as required is increased.

Fourth Embodiment

Figure 12:
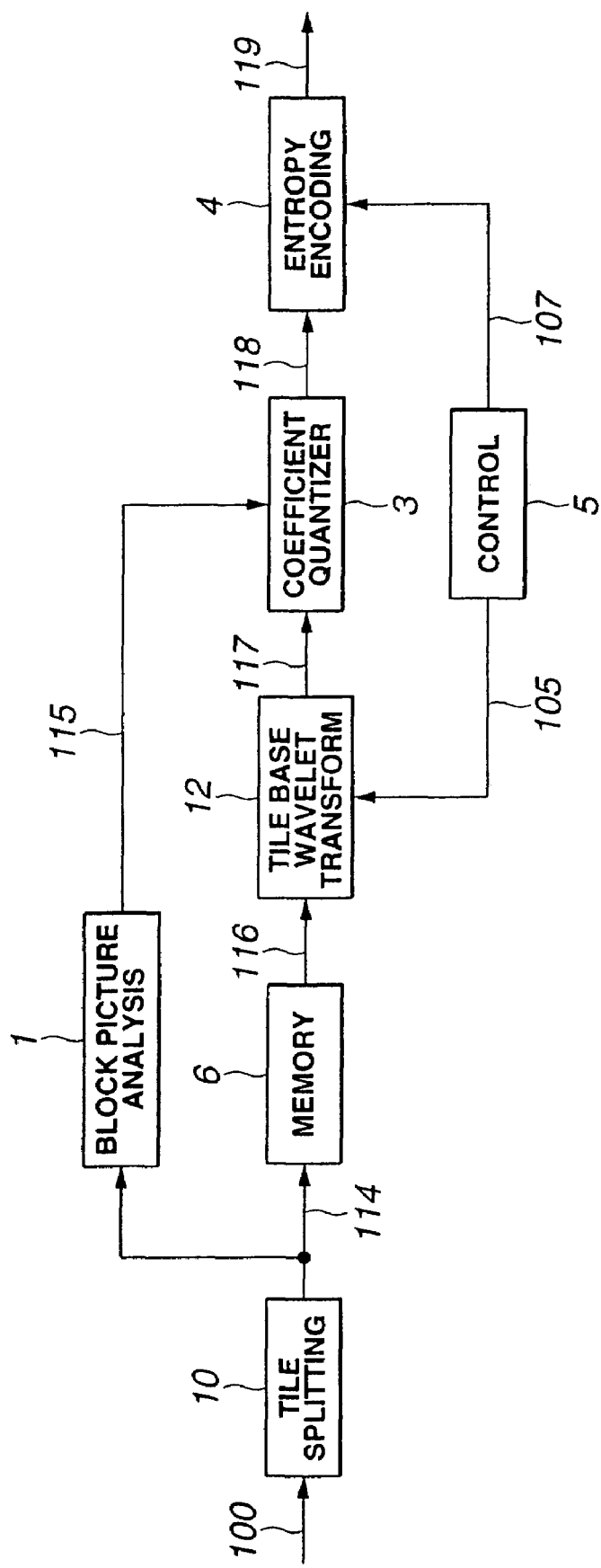
FIG. 12 is a schematic view block diagram showing a schematic structure of a picture encoder as a fourth embodiment of the present invention.

The fourth embodiment of the present invention includes tile splitting means, upstream of the wavelet transform encoding unit, for splitting the input picture into plural rectangular tiles, and a downstream side encoding means for encoding picture data in each tile picture read out into a memory. An illustrative structure of the picture encoding device of the present fourth embodiment is shown in FIG. 12. The picture encoding device, shown in FIG. 12, is similar to the encoding device of FIG. 1 except that a tile splitting unit 10 is provided on the upstream side of the picture encoding device shown in FIG. 1. So, the encoding device, shown in FIG. 12, is not explained specifically.

Figure 13:
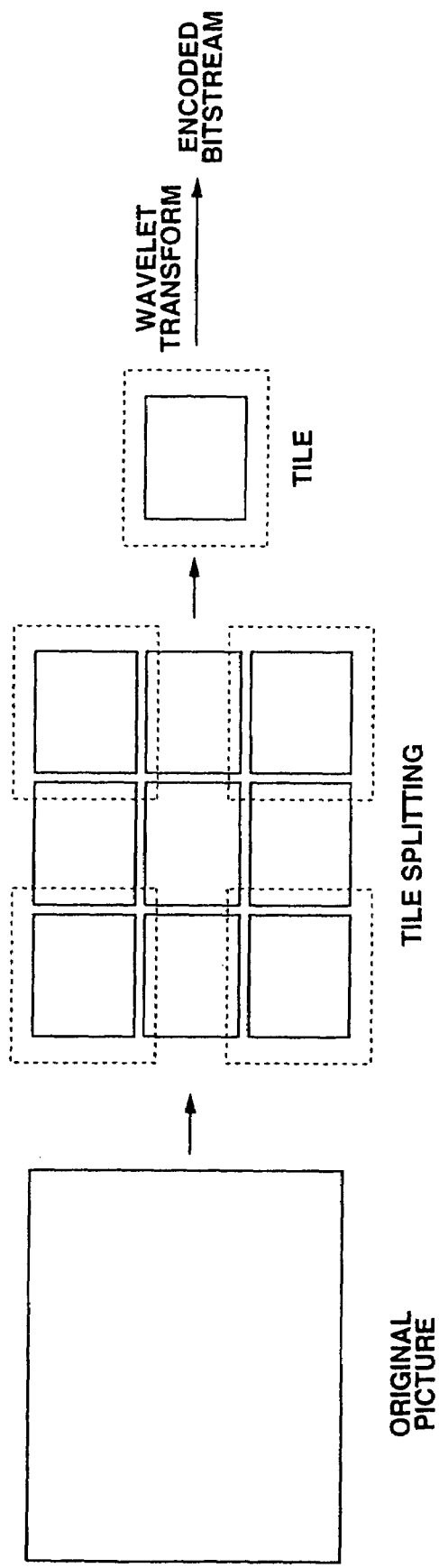
FIGS. 13A, 13B and 13C illustrate the concept of tile-based wavelet transform encoding.

FIG. 13 illustrates the operation of splitting the original picture into plural tiles and applying wavelet transform to each tile. In FIG. 13, solid lines indicate the boundaries of actual tiles and broken lines indicate the boundary of an area affected by wavelet transform filtering as later explained.

That is, the original picture, shown in FIG. 13A, is split into plural tiles, as shown in FIG. 13B. Each tile is subjected to wavelet transform filtering in a range up to the boundary shown by a broken line in FIG. 13C to generate an encoded bitstream.

In FIG. 12, each tile picture 114 from the tile splitting unit 10 is input to the block picture analysis unit 1 where the analysis information 115 is produced by the technique as described above and is issued as output. It should be noted in this connection that the tile picture 114 need not necessarily be the same as the aforementioned block picture. That is, plural blocks may be present in one tile. In general, the tile size is set so as to be larger than the block size. However, for simplifying the processing, such as encoding, these sizes are routinely set to as to be powers of 2.

A tile picture 114 from the tile splitting unit 10 of FIG. 12 is stored and held in the memory 6. A explained in connection with the first embodiment, when the picture data are read out from line to line, buffered and wavelet transformed, the tile picture 114 is read out line by line and stored in the memory 6. On the other hand, if the entire picture is to be buffered once and for all as described above in connection with the third embodiment, the totality of picture data in the tile picture 114 are stored in the memory 6. The present fourth embodiment is able to cope with any of these configurations. The operation downstream of the wavelet transform unit 11 has already be explained in connection with the respective embodiments.

Picture data 116, sent out from the memory 6, are wavelet transformed in the wavelet transform unit 11 in accordance with the control signal from the control unit 5 and wavelet transformed to output transform coefficients 117. These transform coefficients 117 are quantized in the coefficient quantizing unit 3 to produce quantization coefficients which are routed to the entropy encoding unit 4. The entropy encoding unit performs entropy encoding, based on a control signal 105 from the control unit 5, so that an encoded bitstream 119 is sent out by the entropy encoding 4. The operation of adaptively quantizing the coefficients using the analysis information 115 from the block picture analysis unit 1 is similar to that already explained in connection with the previous embodiments.

Fifth Embodiment

This fifth embodiment achieves the filtering operation up to neighboring tiles in the wavelet transform of tile pictures in the above-described fourth embodiment.

If wavelet transform is applied from tile to tile, as described above, it is necessary to take account of tiles other than the tiles being encoded. That is, if wavelet transform is performed from tile to tile, the filtering affects the pixels around the tile by a length corresponding to the tap length of the filter. So, the filtering is performed with overlap with respect to neighboring tiles. This overlap type tile-based wavelet transform, in which pixels of neighboring tiles affected by the filtering are read out for wavelet transform, is now explained with reference to FIG. 14.

Figure 14:
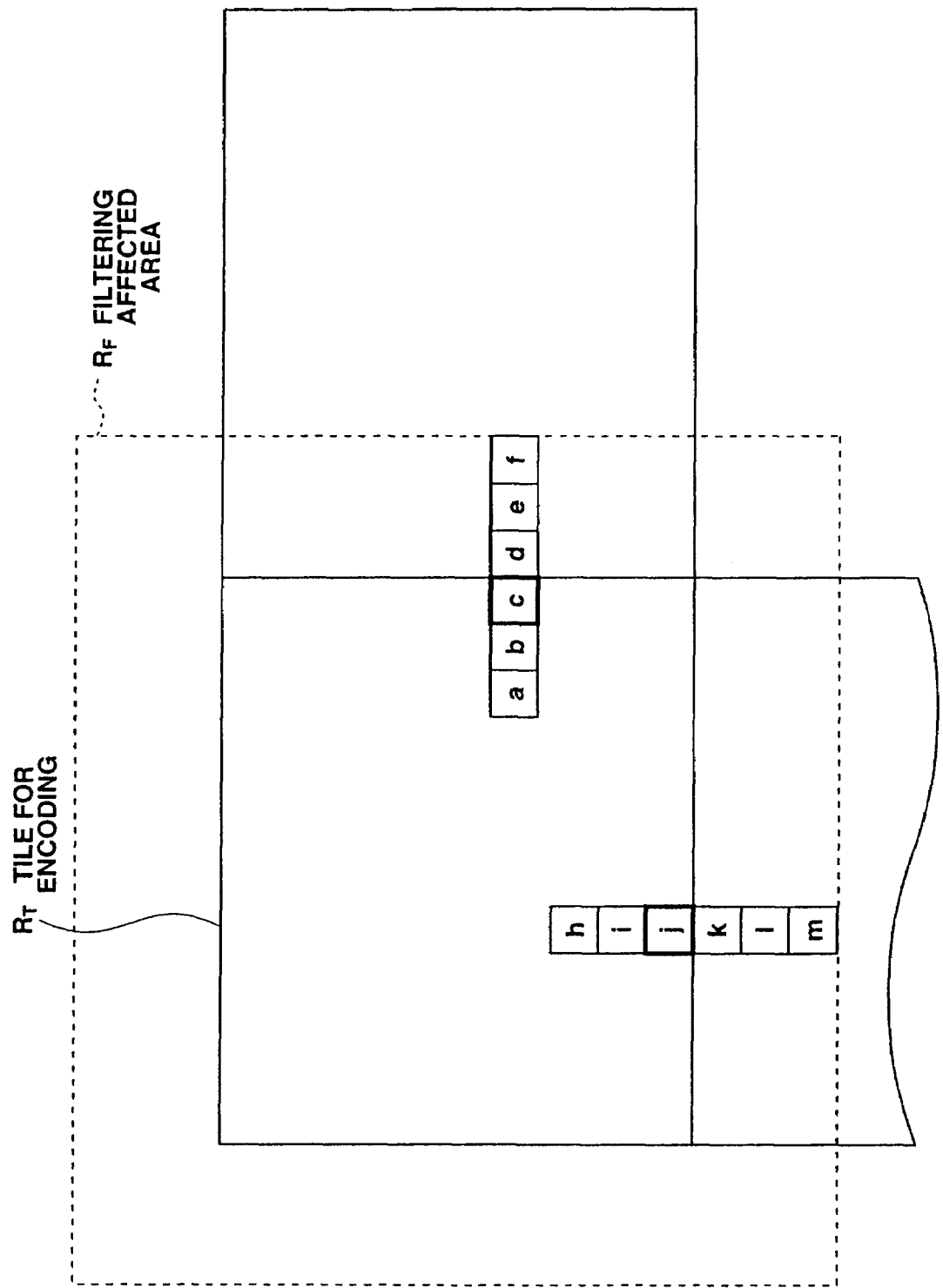
FIG. 14 illustrates convolutional processing in overlapped wavelet encoding.

FIG. 14 shows tile or blocks $R_T$ to be encoded and a range $R_F$ affected by filtering in case of performing the tile-based wavelet transform. In FIG. 14, a to f and h to m all denote pixels. For example, if the pixel c is to be filtered in the horizontal direction, three pixels d, e, f are read out from the right neighboring tile picture and convolved with pre-set filtering coefficients. In similar manner, if the pixel j is to be filtered in the vertical direction, three pixels k, l and m are read out from the lower tile picture and convolved with pre-set filtering coefficients.

Thus, in the tile splitting unit of the present fifth embodiment, a frame picture is split into plural tiles, whilst pixels of neighboring tiles, affected by the filtering by the wavelet transform means, are read out to enlarge the area being encoded. In this case, the manner of acquiring the pixels of the area affected by the filtering outside the tile being encoded represents a problem.

In this fifth embodiment, there is provided no overlapping area between pictures of neighboring tiles. Instead, the wavelet transform coefficients within the tile are symmetrically extended and processed by convolution within an area outside tile affected by the, filtering. This is shown in FIG. 15 specifically showing an area around a tile and in FIG. 16 showing the process in which wavelet splitting is performed as convolution processing is performed on the original picture for symmetrical expansion.

Figure 15:
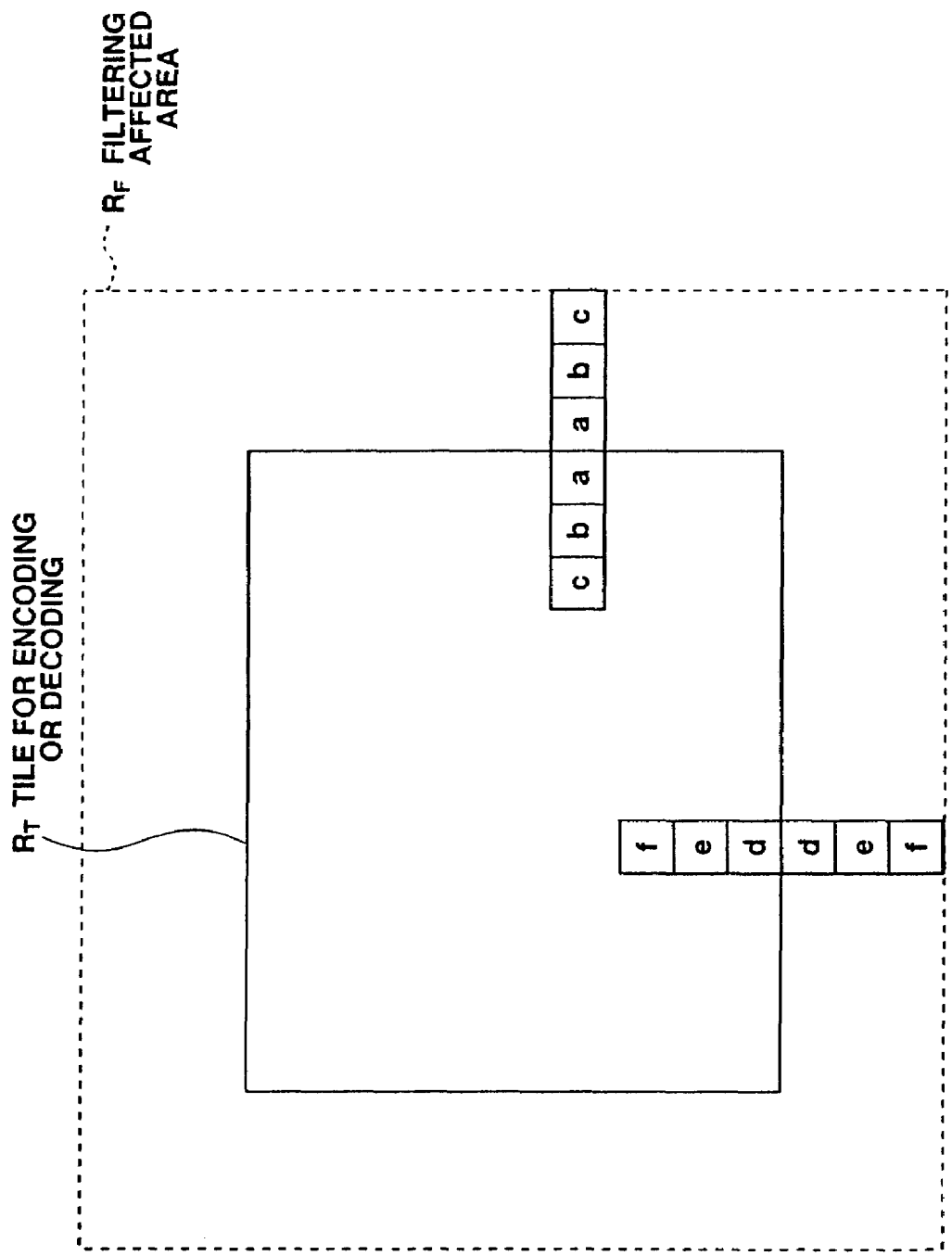
FIG. 15 illustrates the concept of symmetrical convolutional processing.

Referring to FIG. 15, illustrating this symmetrical expansion, it will be seen that a horizontal pixel array of c, b, a in a tile area $R_T$ to be encoded or decoded, is expanded in the arraying order of a, b, c, symmetrically with the tile boundary as a boundary, up to $R_F$ delimiting an area affected by the filtering. In the vertical direction, a pixel array f, e, d in the tile area RT is extended in the arraying order of d, e, f, symmetrically with the tile boundary as a boundary, up to $R_F$ delimiting an area affected by the filtering. It has been known that, by this mirror-image symmetrical expansion, only the same number of wavelet transform coefficients as the number of pixels in the tile picture is generated, thus eliminating the redundancy.

The concept of wavelet encoding by symmetrical convolution is shown in FIGS. 16A to 16C. The original picture, shown in FIG. 16A, is split into tile pictures, shown in FIG. 16B. For each tile picture, pixels are symmetrically expanded to an area outside the tile, for each tile picture, up to a broken line in FIG. 16C delimiting an area affected by filtering.

The wavelet transform (WT) then is applied to each tile, symmetrically expanded as shown in FIG. 16C. As a result, each tile picture is split into e.g., four band components, as shown in FIG. 16D. The areas shown shaded in FIG. 16D represent the low-range components LL. Each tile of the low range component LL, shown shaded, is expanded symmetrically, in similar manner, as shown in FIG. 16E, by way of executing the wavelet transform (WT). The similar symmetrical expansion is performed until a pre-set number of wavelet splitting is reached. The foregoing is the explanation of the wavelet transform with tile-based symmetrical expansion in the tile splitting and wavelet transform areas of the fifth embodiment.

Sixth Embodiment

In a sixth embodiment of the present invention pixels for encoding outside the tile are expanded by symmetrical expansion, at the time of tile-based wavelet transform, so that the pixels in an area outside the tile affected by filtering are symmetrically expanded in a point-symmetrical relation with respect to the pixel value on the tile boundary.

Figure 17A:
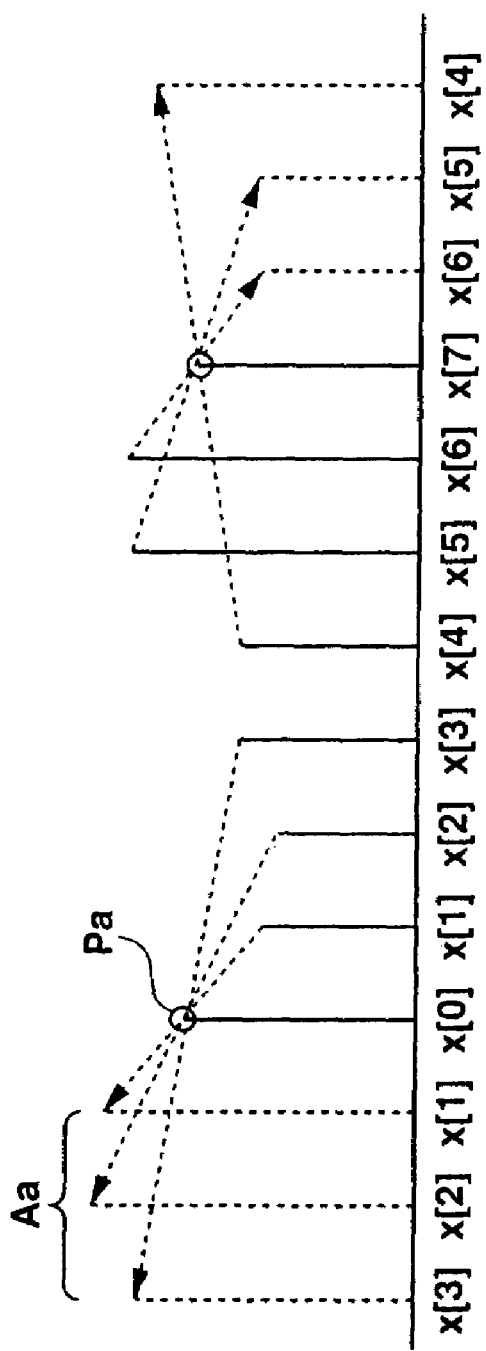
FIGS. 17a and 17b illustrate the concept of point-symmetrical convolutional processing.
Figure 17B:
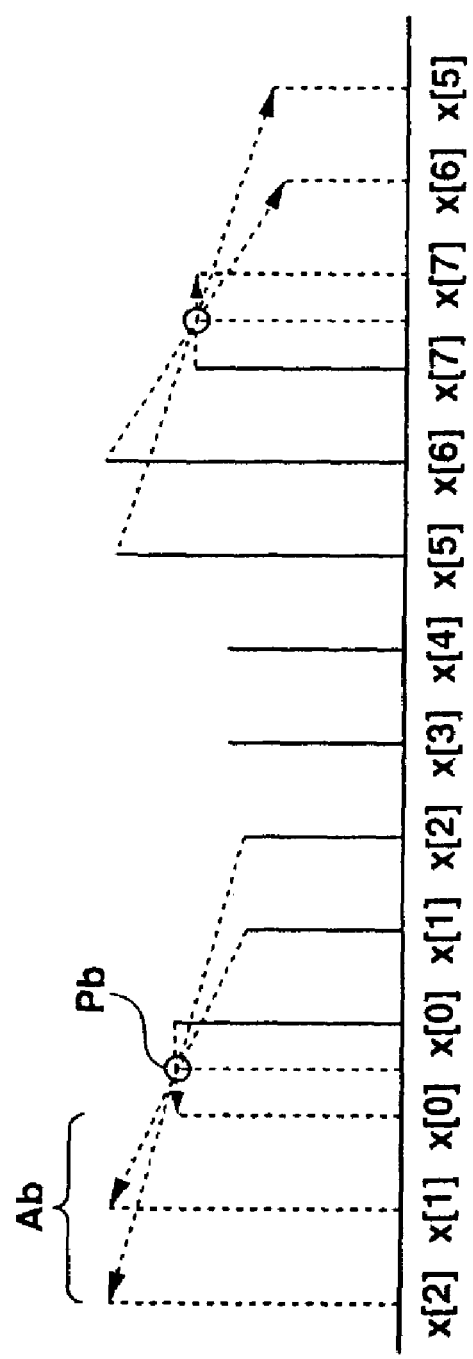

FIGS. 17a and 17b show two examples in which eight sample points X[0], X[1], X[2], X[3], X[4], X[5], X[6], X[7] denote pixels in the tile (only in a one-dimensional direction).

On the other hand, pixels of sample points, indicated by broken lines, are computed with the pixel values of X[0] or [7] as reference values for point symmetry. In FIG. 17a, a point Pa denoting the pixel value at a sample position of a sample point X[0] on the tile boundary is a reference point of point symmetry. For example, a sample point x[1] outside the tile is obtained by calculating an equidistant point on a straight line extended from the sample point X[1] at a point-symmetrical position in the tile through the reference point Pa. That is, the sample point x[1] is at a position of point symmetry with respect to the sample point X[1]. In similar manner, sample point [x]2 and x[3] are at point-symmetrical positions with respect to the sample points X[2] and X[3], with the reference point Pa as center. The same applies for the opposite side boundary of the tile where the pixel value at a sample point X[7] is to be a reference point of point symmetry.

The case of FIG. 17b differs from that of FIG. 17a in that a reference point Pb as the center of point symmetry is offset a distance equal to a half sample with respect to a sample position. That is, a point Pb denoting a pixel value equal to a sample point X[0] at a position offset a distance equal to one half sample to outside the tile from a sample position of the sample point X[0] at the tile boundary is a reference point of point symmetry. Thus, a sample point x[0] at a position spaced one sample to outside the tile from the sample point X[0] is at a point symmetry with respect to the sample point X[0] with the reference point Pb as center, so that it is of the same value as that of the sample point X[0]. In this manner, a point on the inner side of the tile boundary, such as X[0], and a point outside the tile boundary, such as x[0], are of the same magnitude, thereby assuring smooth junction on the tile boundary.

By pixel expansion employing the relation of point symmetry by any of the techniques shown in FIGS. 17a or 17b, the pixel values in the tile can be enlarged to an area affected by filtering by wavelet transform outside the tile, without employing the pixel values of neighboring tiles, by way of performing convolution processing.

Seventh Embodiment

A seventh embodiment of the present invention is explained. In this seventh embodiment, only a part of pixels within an area outside the tile affected by filtering are extracted for convolution processing.

In the above-described fifth and sixth embodiments, the totality of pixels within an area affected by filtering are found. In the present seventh embodiment, only a part of these pixels are extracted. By extracting only a part of the pixels within the area affected by filtering, the number of times of convolution processing can be advantageously reduced. Although picture quality deterioration (discontinuities) are likely to be produced at the tile boundary, no significant difference is produced in case of using a higher encoding bitrate.

Eighth Embodiment

The present eighth embodiment proposes another configuration of the above-described block-based quantization control. Although the same structure as that explained with reference to FIG. 1 may be used, the operation in the coefficient quantizing unit 3 differs. Here, quantization coefficients obtained on scalar quantization of wavelet transform coefficients, generated by the wavelet transform unit 2, as previously explained, are resolved into bit planes from the MSB to the LSB. The concept of the bit planes has been explained with reference to FIG. 10 and therefore is not explained for simplicity.

As the operation occurring in the coefficient quantizing unit 3, binary data are entropy encoded, in a usual case, from one bit plane to another, in the direction from the MSB to the LSB of the bit plane, as explained in connection with the above-described second embodiment. However, in the present eighth embodiment, the bit planes of the blocks, obtained on splitting into plural sub-bands present in the same sub-band, are shifted in an amount corresponding to a predetermined number of bits and newly generated bit planes are entropy encoded.

Figure 18A:
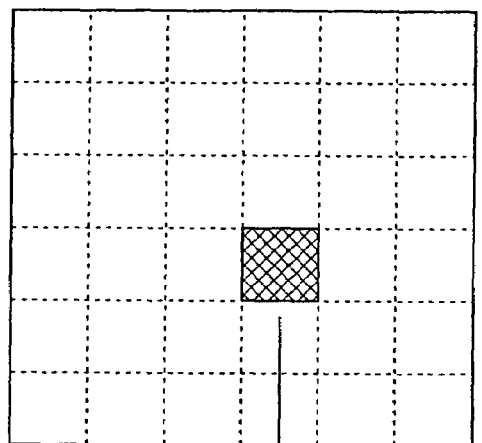
FIGS. 18A and 18B illustrate a sub-band obtained on wavelet splitting of a picture and the corresponding bit plane.
Figure 18B:
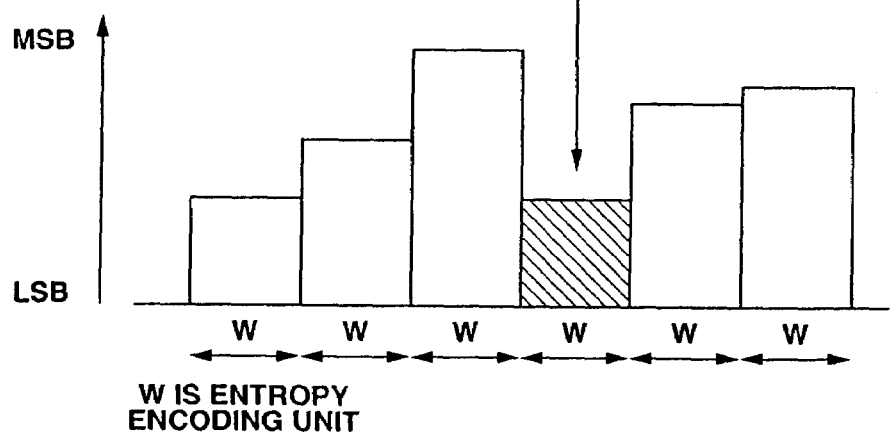

The present embodiment is now explained with reference to FIGS. 18A and 18B. FIG. 18A shows a sub-band obtained on wavelet splitting a picture. 6 vertical by 6 horizontal blocks, totalling at 36 blocks, as divided by broken lines, are assumed to be block units for downstream side entropy encoding. FIG. 18B is a cross-sectional view of a bit plane in a sub-band. Although the bit plane is two-dimensional, it is shown as being one-dimensional. In FIG. 18B, the width of the entropy encoding unit is denoted W. The netted area in a sub-band of FIG. 18A corresponds to the bit plane shown shaded in FIG. 18B, in which the ordinate represents the depth of the bit plane from the MSB to the LSB.

Meanwhile, one block area in an original picture has its vertical and horizontal sizes halved as the splitting stage is incremented by one, as explained with reference to FIG. 6. That is, in the block area P (netted area) of FIG. 9, one-half the vertical and horizontal sizes of the first-level block area $P_1$ becomes the vertical and horizontal sizes of the second-level block area $P_2$. In general, (vertical and horizontal size of $P_{n+1}$)=(vertical and horizontal size of $P_n$)/2.

So, the relative magnitudes of a block of a certain sub-band, obtained on wavelet splitting a specified area of a picture, and the above-described entropy encoded block, need to be taken into consideration.

Figure 19B:
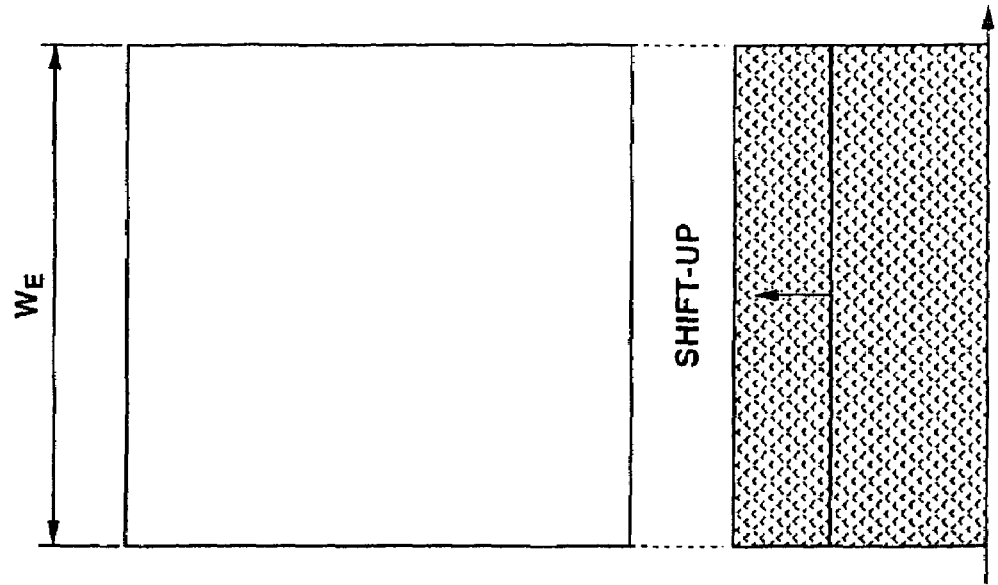
FIGS. 19A and 19B illustrate bit plane shift processing of a block obtained on sub-band splitting a specified picture area.
Figure 19A:
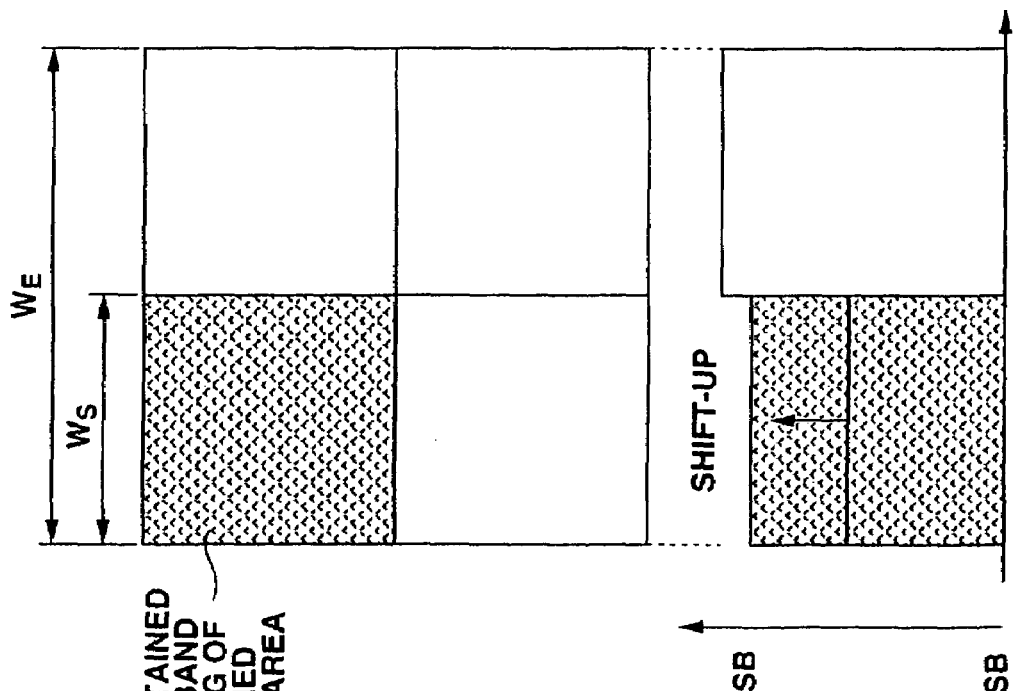

If the size $W_S$ of a sub-band block of a specified area of a picture, shown netted in FIG. 19A, is smaller than the size $W_E$ of an entropy encoded block, that is if $W_S<W_E$, as shown in FIG. 19A, the bit plane corresponding to the sub-band of a specified area of a picture is shifted up towards the MSB side, or shifted down towards the LSB side. After the shifting operation of the totality of sub-band blocks in the entropy encoding block is finished, entropy encoding processing is performed on the newly generated bit plane. Meanwhile, the shift-up operation contributes to improved picture quality of the block area, whereas the shift-down operation deteriorates the picture quality. This achieves picture quality control.

The bit plane shifting-down operation may also be performed on the entropy encoding blocks other than those existing in the block area in question to achieve equivalent effects as those described above. On the decoder side, a reverse operation to this shifting operation is required. This bit shifting value needs to be written in the encoded bitstream.

On the other hand, FIG. 19B shows a case wherein the size $W_S$ of the sub-band block of a specified area of a picture is larger than or equal to the entropy encoding block size $W_E$, that is a case wherein $W_S \geqq W_E$. In this case, the totality of the entropy encoding units present in the sub-band split block is bit-plane encoded after the shifting operation of the sub-band split block is finished.

Ninth Embodiment

The picture encoding device according to a ninth embodiment of the present invention writes an input picture on the line basis in memory means for storage, applies wavelet transform in the horizontal and vertical directions each time a picture stored in memory means reaches the number of lines required for wavelet transform, quantizes the wavelet transform coefficients obtained on wavelet transform, resolves the produced quantization coefficients into bit planes from the MSB to the LSB and performs entropy encoding when the number of samples of the quantization coefficients reaches a pre-set size. In performing the entropy encoding, a portion of the bit plane from the MSB to the LSB is split and extracted in each of the bit planes of plural entropy encoding blocks present in one and the same sub-band, and the fractional bit planes are encoded from the MSB to the LSB to generate the fractional bitstreams corresponding to the fractional bit planes.

Figure 20:
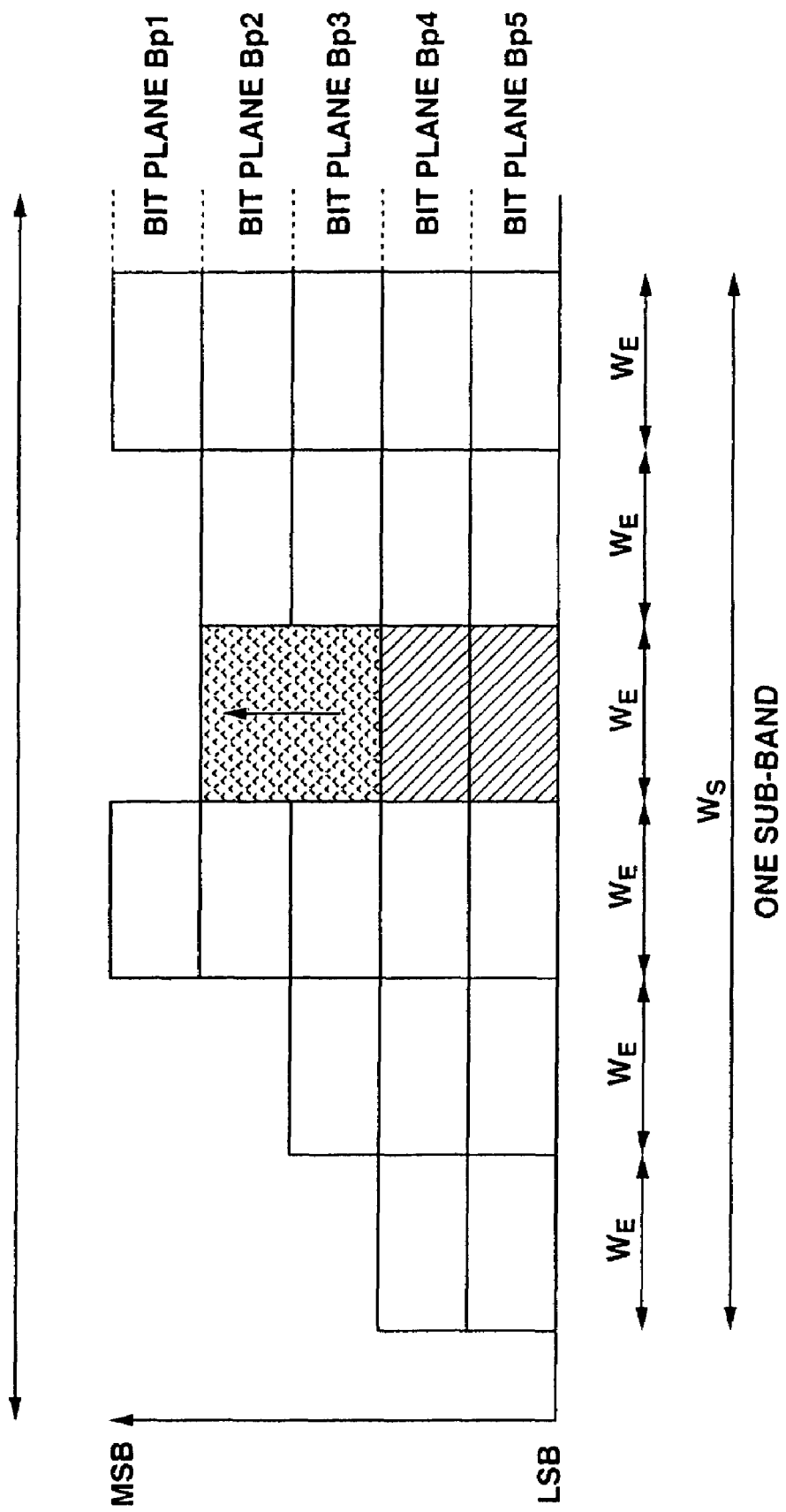
FIG. 20 illustrates bit plane encoding of an entropy encoded block present in a sub-band.

In the ninth embodiment, the operation until resolution of the quantization coefficients into bit planes from MSB to LSB is the same as the eighth embodiment. In the preferred ninth embodiment, the respective bit planes are sequentially entropy encoded one by one from the MSB to the LSB. So, each entropy encoding block is independent. On the other hand, in the preferred ninth embodiment, encoding is performed astride the bit planes of the totality of the entropy encoding blocks existing in the one and the same sub-band. Referring to FIG. 20, the operation is explained specifically.

FIG. 20 shows a cross-section (one-dimensional) of a bit plane of an entropy encoding block in a sub-band. In FIG. 20, the size of the sub-band block is denoted $W_S$ and the entropy encoding size block is denoted $W_E$, indicating that the block of the shaded area has been shifted up by two bits. The shifting-up operation newly generates a bit plane in a netted area. The result is that, if the totality of the entropy encoding blocks present in the same sub-band are entropy encoded on the bit plane basis from the MSB (bit plane Bp1 in FIG. 20) to the LSB (bit plane Bp2), the bit array becomes different from that in the initial bit plane, as a result of the aforementioned shifting operation, so that the sequence of the encoded bit planes differs from one entropy encoding block to another.

For example, after shifting the bit plane of the block divided into sub-bands by a pre-set number of bits, the totality of the entropy encoding blocks existing in the same sub-band may be sequentially encoded in a direction from the MSB to the LSB on the bit plane basis.

In the present embodiment, picture quality scalability decoding, in which the picture quality is gradually improved stepwise, with the resolution remaining constant, may be realized by sequentially decoding from the MSB towards the LSB on the decoder side. This is effective on the Internet or on the network, such as radio network, where the network speed is limited.

The above-mentioned blocks, split into sub-bands, are inherently generated on wavelet splitting the specified spatial picture areas of an input image. The block information may be furnished by means for analyzing the motion information in a block picture or fineness of the texture from one spatial block area picture forming an image to another.

On splitting into respective bit planes, the bit planes may be classified into those for absolute value data of 0 and 1 and those for plus and minus signs. It is therefore possible to realize a high compression ratio by arithmetic coding of these absolute value data and the codes.

Tenth Embodiment

This tenth embodiment represents the expansion of the above-described ninth embodiment. In this ninth embodiment, bit-plane encoding from the MSB to the LSB is made independently from band to band. However, in a picture, more energy is generally concentrated in low-range components. So, by placing more emphasis on low-range sub-bands than on high-range sub-bands, a picture with superior subjective picture quality may be expected to be furnished for the same bitrate.

Based on this concept, the preferred tenth embodiment arrays the encoded bitstreams of the entropy encoding blocks from the lowest range sub-band with the maximum number of splitting stages towards the highest range sub-band with the least number of the splitting stages to improve the subjective picture quality for the same bitrate. On the side decoder, scalability decoding can be realized, in which the resolution of a decoded picture is progressively improved as the encoded bitstream generated using means of the present embodiment keeps on to be decoded.

Eleventh Embodiment

If, in the present eleventh embodiment, the input picture is an interlaced picture, the aforementioned shift-up means is used for a block in question decided to exhibit marked motion from the analysis information provided by the block picture analysis unit, in order to shift the bit plane of the block area in question.

The interlaced picture is explained with reference to FIG. 21. The television broadcast we are familiar with uses an interlaced picture obtained on interlaced scanning, and is made up of odd and even fields. This is illustrated in FIG. 21, in which lines La1, La2, . . . denote odd fields and lines Lb1, Lb2, . . . denote even fields.

Figure 21:
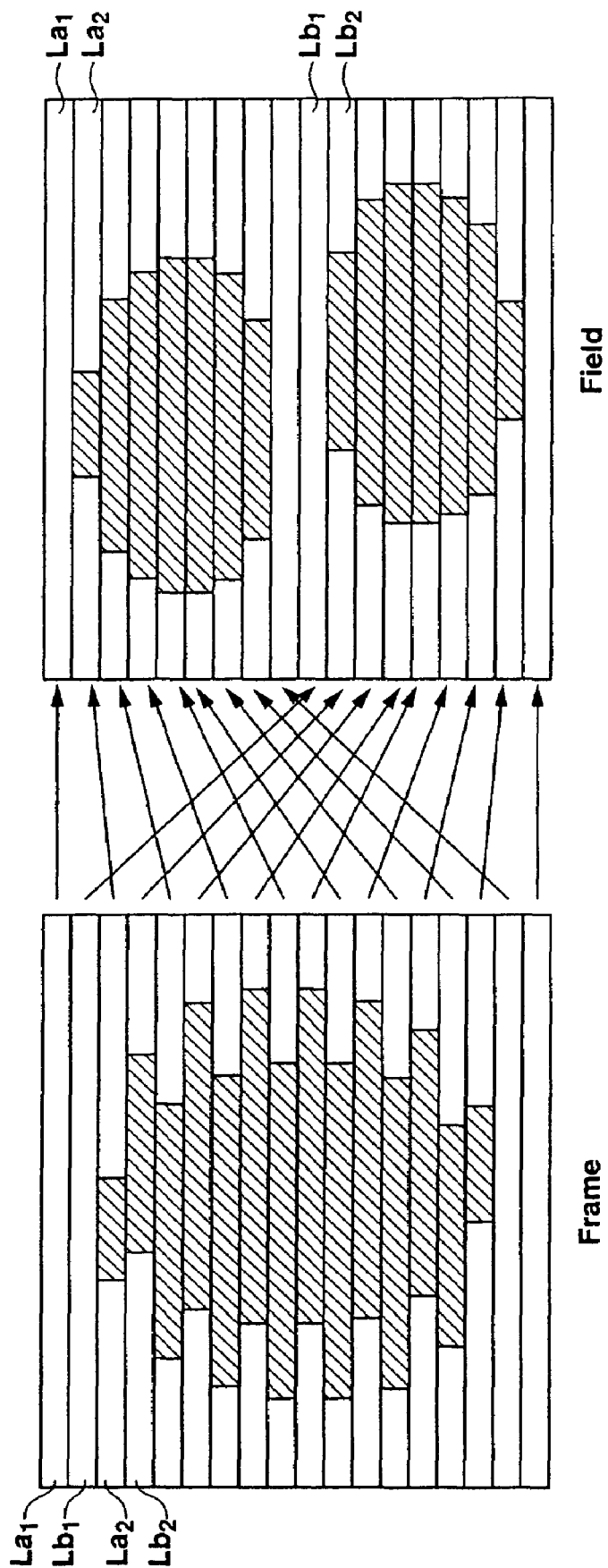
FIG. 21 illustrates frame and field pictures for an interlaced picture.

The interlaced picture is made up of odd fields and even fields, alternated with each other on the line basis, as shown by a frame structure on the left hand side of FIG. 21. If this interlaced picture is encoded in the state of the frame picture, the efficiently may occasionally be lowered. That is, if, in an interlaced frame picture, the object shows vigorous motion, deviation tends to be apparent between odd and even fields, as in the frame structure shown on the left side of FIG. 21. This leads to the lowered efficiently in the downstream side encoding. By dividing the frame structure into field structures shown on the right side of FIG. 21, deviation between neighboring lines is eliminated to prevent the efficiently from being lowered.

Therefore, if the interlaced frame picture as such is to be encoded, it is advisable to raise the picture quality in the block. As the analysis information, the analysis information 106 from the block picture analysis unit 1, as already explained in connection with the first embodiment, shown in FIG. 1, may be used.

Twelfth Embodiment

In ths twelfth embodiment, for a block for entropy encoding, decided by the above-described analysis information to be a still area, the above-mentioned shift-up means is used to shift the bit plane of the block area for entropy encoding. This takes account of the fact that a still area is generally more noticeable to the human visual system such that picture quality deterioration in the still area is detectable more readily. The picture quality may be improved by shift-up of the bit plane of the block area.

Thirteenth Embodiment

This thirteenth embodiment speeds up the encoding processing of each tile picture by parallel processing in case of wavelet transform encoding following tile splitting. That is, since the tiles obtained on splitting a picture can be encoded separately from one another, as explained in connection with the above-described fourth embodiment, high-speed encoding can be realized if the respective tile pictures are processed in parallel. For example, in a LSI (large-scale integrated circuit) or a computer system, carrying plural CPUs, it sufficers to allocate the encoding processing for a sole tile picture to each CPU and to perform the tile encoding sequentially.

Fourteenth Embodiment

The fourteenth embodiment of the present invention is now explained. The previous embodiments all relate to encoding means for still pictures. However, since a concatenation of still pictures represent a moving picture, the encoding technique may obviously be applied to encoding of moving pictures. In this case, there are required means for dividing the continuous moving picture into respective frames. In general, the NTSC signals use a configuration of converting analog signals into digital signals and storing the moving picture of digital signals in a buffer on the frame basis. The respective frames, thus stored, may then be encoded by still picture encoding means discussed above.

It is similarly possible to buffer a certain plural number of frames of the pictures and to then proceed to wavelet transform encoding. However, in this case, the memory capacity required is increased.

Fifteenth Embodiment

When encoding the quantization coefficients from one entropy encoding block to another, by means discussed above, there are as many bit planes of the entropy encoding blocks as the number of planes from the MSB to the LSB. In the present fifteenth embodiment, the respective bit planes are resolved into plural sub-bit planes.

Figure 22:
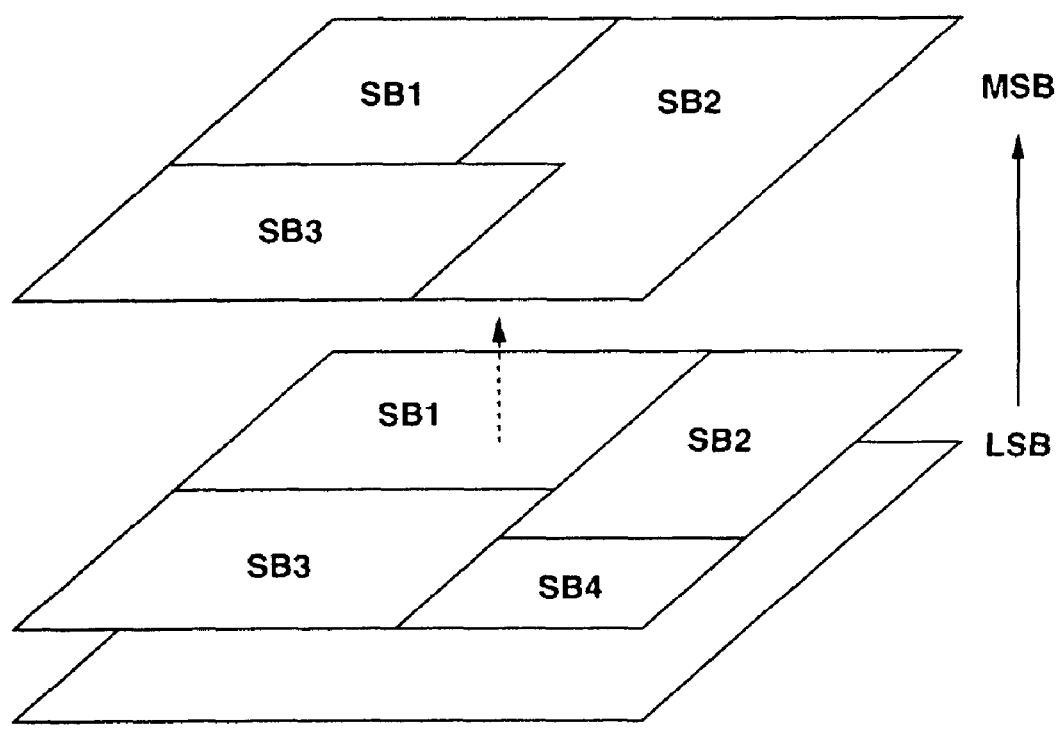
FIG. 22 illustrates a bit plane and a sub-bit plane.

This is illustrated in FIG. 22, in which a bit plane corresponding to the MSB is made up of three sub-bit planes SB1, SB2 and SB3. A lower order bit plane is made up of four sub-bit planes of SB1, SB2, SB3 and SB4. These sub-bit planes may be processed in respective encoding paths which may be set arbitrarily. Specifically, it is more efficient to execute the encoding as statistical data for optimum arithmetic encoding are estimated from the distribution information of a data string made up of binary data of 0 and 1. To this end, such technique already publicized in a number of extended abstracts may be used.

It is noted that three encoding paths are provided in the entropy encoding of the JPEG2000 standard. If the totality of three encoding paths are used, the compression efficiency may be maximum, however, the processing volume or time is increased. The smaller the number of the encoding paths, the lower becomes the compression efficiency. However, the processing volume or time is diminished. With the number of the encoding paths equal to zero, entropy encoding is not performed, with the processing volume being equal to zero, such that the original quantization coefficients data are issued directly as output. These encoding paths are selected independently for the respective sub-bit planes.

The manner in which the encoding paths of the sub-bit planes are opted and selected for each entropy encoding block of a matrix in which the sub-bit planes in question exist is hereinafter explained. The criterium for the selection means is explained in the embodiments which will be explained subsequently.

Sixteenth Embodiment

In this sixteenth embodiment, the manner in which the encoding paths of the sub-bit planes opted and selected are varied from one bit plane to another is explained. In this sixteenth embodiment, option and selection are made such that all of the encoding paths of three sub-bit planes SB1, SB2 and SB3 present in the MSB bit plane in FIG. 22 are processed, whereas only two of four sub-bit planes SB1, SB2, SB3 and SB4 present in the lower bit plane are processed, thereby elevating the encoding efficiency while suppressing picture deterioration.

The reason is that the MSB affects the picture quality more strongly than the LSB, that is that the MSB is more significant coefficient than the LSB. Therefore, in reducing the number of encoding bits, it is advisable to perform the processing for encoding paths of the sub-bit planes SB1 to SB3 present in the MSB bit planes preferentially to omit one or more or all of the encoding paths of the sub-bit planes SB1 to SB4 present in the bit plane towards the LSB.

Seventeenth Embodiment

In this seventeenth embodiment, it is shown that the encoding paths of the sub-bit planes opted and selected become variable with the band types of the sub-band comprehending the sub-bit planes.

Figure 23:
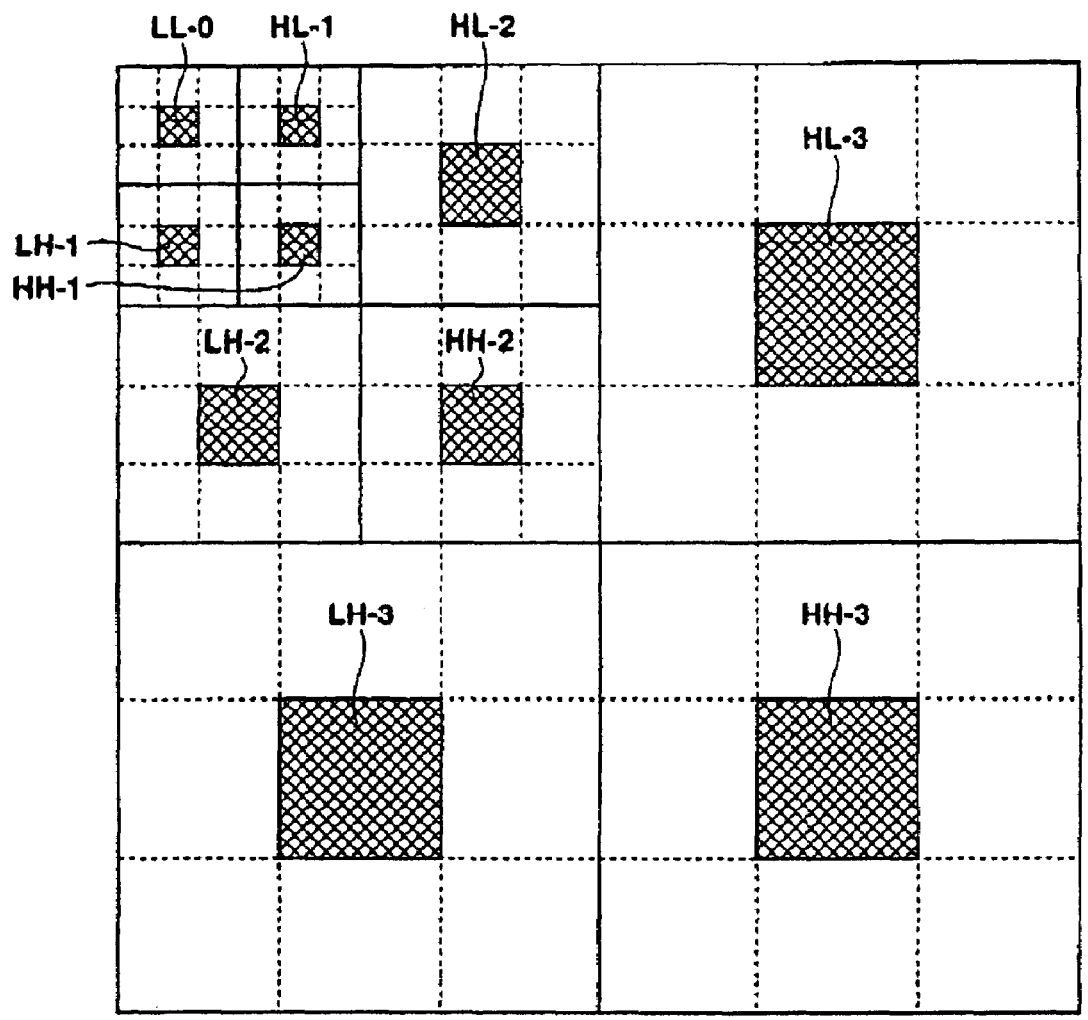
FIG. 23 illustrates sub-band areas generated following wavelet transform.

FIG. 23, for example, shows respective sub-bands generated as a result of executing the three stages of the wavelet transform. For example, if the band comprehending the bit plane of the sub-bit plane is LL-0 (lowest band), the encoding paths of the sub-bit plane is processed preferentially, whereas, if the band comprehending the bit plane of the sub-bit plane is HH-3, existing in a high range, the priority is made lowest such that part or all of the encoding paths are omitted.

The above-described operation is performed for each of the encoding blocks corresponding to the sub-band for the specified area of the picture to realize picture quality control individually associated with the specified area of the picture.

Eighteenth Embodiment

In this eighteenth embodiment, more bit planes are encoded for the entropy encoding block of the lower sub-band than those for the entropy encoding block of the higher sub-bands.

That is, in FIG. 23, all or a majority of the bit planes from the MSB to the LSB of the entropy encoding blocks of the lower sub-band LL-0 are preferentially encoded, whereas the number of bit planes of the entropy encoding blocks to be encoded is reduced to a smaller number or to zero towards a higher sub-band.

In this manner, the priority is raised to encode more bit planes towards a lower band side where the picture energy is concentrated, thus providing a picture in which more emphasis is attached to the lower frequency. Moreover, by performing the above processing for each encoding block corresponding to a sub-band corresponding in turn to a specified area in a picture, it becomes possible to perform picture quality control individually associated with specified areas of the picture.

Nineteenth Embodiment

In this nineteenth embodiment, more encoding paths of sub-bit planes are processed in the encoding of respective bit planes in the entropy encoding blocks of the lower sub-bands than in the entropy encoding blocks of the higher sub-bands.

That is, all or a majority of the encoding paths of sub-bit planes present in the respective bit planes from the MSB to the LSB of FIG. 22 are processed in the entropy encoding blocks present in the lowest sub-band LL-0, as shown in FIG. 23. Conversely, the number of the encoding paths of the sub-bit planes is decreased in the encoding of the respective bit planes in the direction of the increasing frequency, that is towards the highest frequency band HH-3.

The present nineteenth embodiment may be combined with the technique in which emphasis is placed on the encoding paths towards the MSB as explained in connection with the sixteenth embodiment, whereby finer picture quality control may be realized. The above processing can be performed from one encoding block corresponding to a sub-band for the specified area of the picture to another to realize picture quality control individually associated with the specified area in the picture.

It is also possible to multiply the quantization coefficients in the embodiment of FIG. 15 with the weighting coefficients explained in connection with the first embodiment. In this case, since the quantization coefficients of the sub-band for the crucial picture band have already been multiplied by the weighting coefficients explained in connection with the first embodiment, the coefficient distribution is offset towards the MSB side. So, even if the encoding paths of the sub-bit planes are controlled to be increased or decreased from one bit plane from the MSB to the LSB to another as explained in connection with the sixteenth embodiment, the emphasis is placed on the MSB side, with the result that the picture quality of the picture area is maintained.

In these fifteenth to nineteenth embodiments, means of increasing or decreasing the number of the bit planes from the MSB to the LSB for each entropy encoding block present in the sub-band of the specified picture area, the number of encoding paths of the sub-bit planes for each bit plane from the MSB to the LSB or the encoding paths of the sub-bit planes from the low range to the high range, may be selectively used to realize fine picture quality control to maintain high picture quality.

The illustrative application of the respective embodiment of the present invention may be enumerated by an electronic camera, a video camera, a video codec (coder/decoder) for picture monitoring, codec for broadcast VTR, portable and mobile picture transmission/reception terminal (PDA), printer, satellite picture, codec for pictures for medical use, software modules thereof, games, texture companding equipment used in a three-dimensional computer graphics and software modules thereof.

The present invention has been disclosed only by way of illustration and should not be interpreted in a limiting fashion. On the contrary, the present invention can be modified within the scope interpreted in light of the description of the following claims.

What is claimed is:

1. A picture encoding apparatus comprising:

memory means for writing and storing an input picture comprising a plurality of blocks from one line to another;

wavelet transform means for applying wavelet transforms in the horizontal and vertical directions each time the input picture stored in the memory means reaches a predetermined number of lines required for the wavelet transforms to be applied, the wavelet transforms dividing the blocks of the input picture into a plurality of sub-bands and generating wavelet transform coefficients;

quantization means for quantizing the wavelet transform coefficients and outputting quantization coefficients; and entropy encoding means for resolving the quantization coefficients into a plurality of bit planes resolved from most significant bit (MSB) to least significant bit (LSB), shifting bit planes of a plurality of blocks present in a same sub-band by a pre-set number of bits to form shifted bit planes, and entropy encoding the shifted bit planes entropy encoding means has received a predetermined number of quantization coefficients.

2. The picture encoding apparatus according to claim 1 wherein when a width of a block divided into a sub-band is smaller than a width of a an entropy encoding unit block, the entropy encoding means performs entropy encoding after all shifted bit planes in the block divided in the sub-band have been formed.

3. The picture encoding apparatus according to claim 1 wherein when a width of a block divided into a sub-band is larger than a width of a an entropy encoding unit block, the entropy encoding means performs encoding on all shifted bit planes in the block divided into the sub-band after all shifted bit planes in the block divided into the sub-band have been formed.

4. The picture encoding apparatus according to claim 1 wherein said input picture is a continuous picture comprising a plurality of frames and is sequentially encoded from one frame to the next frame.

5. A picture encoding apparatus comprising:

memory means for writing and storing an input picture comprising a plurality of blocks from one line to another;

wavelet transform means for applying wavelet transforms in the horizontal and vertical directions each time the input picture stored in the memory means reaches a predetermined number of lines required for the wavelet transforms to be applied, the wavelet transforms dividing the blocks of the input picture into a plurality of sub-bands and generating wavelet transform coefficients;

quantization means for quantizing the wavelet transform coefficients and outputting quantization coefficients; and entropy encoding means for resolving the quantization coefficients into a plurality of bit planes resolved from most significant bit (MSB) to least significant bit (LSB) and for entropy encoding the quantization coefficients when the entropy encoding means has received a predetermined number of quantization coefficients;

the entropy encoding means splitting and extracting fractional portions of the plurality of bit planes from the MSB to the LSB of a plurality of entropy encoding blocks existing in a same sub-band, encoding the extracted fractional portions of the bit planes from the MSB to the LSB and generating a fractional encoded bitstream corresponding to the fractional portions of the bit planes.

6. The picture encoding apparatus according to claim 5 wherein the entropy encoding means shifts by a predetermined number of bits the bit plane of a block from sub-band division, corresponding to a specified spatial picture area, and subsequently sequentially encodes all entropy encoding blocks existing in the same sub-band from the MSB to the LSB from one bit plane to another.

7. The picture encoding apparatus according to claim 6 wherein information of said specified spatial picture area is motion information in a block picture or analysis information supplied from analysis means for analyzing the fineness of a texture, the analysis information providing information as to whether the input picture exhibits a still area or vivid motion, from one block area picture forming a picture to another.

8. The picture encoding apparatus according to claim 7 wherein if said input picture is an interlaced picture, and the analysis information provides information that the input picture exhibits vivid motion, a bit plane of an entropy encoding block area is shifted up by a predetermined amount.

9. The picture encoding apparatus according to claim 7 wherein if the analysis information provides information that the input picture exhibits a still area, a bit plane of an entropy encoding block area is shifted up by a predetermined amount.

10. The picture encoding apparatus according to claim 5 wherein the entropy encoding means arrays said fractional encoded bitstreams from a lowest sub-band having a maximum number of splitting stages a highest sub-band having a minimum number of splitting areas thereby generating an ultimate encoded bitstream.

11. A picture encoding method comprising:
storing an input picture comprising a plurality of blocks in memory means from one line to another;
applying wavelet transforms in the horizontal and vertical directions each time the input picture stored in the memory means reaches a predetermined number of lines required for the wavelet transforms to be applied, wherein applying wavelet transforms divides the blocks of the input picture into a plurality of sub-bands and generates wavelet transform coefficients;
quantizing the wavelet transform coefficients;
resolving the quantization coefficients into a plurality of bit planes resolved from most significant bit (MSB) to least significant bit (LSB);
shifting bit planes of a plurality of blocks present in a same sub-band by a pre-set number of bits to form shifted bit planes; and
entropy encoding the shifted bit planes a predetermined number of quantization coefficients have been received.

12. A picture encoding method comprising:
storing an input picture comprising a plurality of blocks in memory means from one line to another;
applying wavelet transforms in the horizontal and vertical directions each time the input picture stored in the memory means reaches a predetermined number of lines required for the wavelet transforms to be applied, the wavelet transforms dividing the blocks of the input picture into a plurality of sub-bands and generating wavelet transform coefficients;
quantizing the wavelet transform coefficients; and
resolving the quantization coefficients into a plurality of bit planes resolved from the most significant bit (MSB) to the least significant bit (LSB) and entropy encoding the quantization coefficients when a predetermined number of quantization coefficients have been received;
splitting and extracting fractional portions of the plurality of bit planes from the MSB to the LSB of a plurality of entropy encoding blocks existing in a same sub-band;
encoding the extracted fractional portions of the bit planes from the MSB to the LSB; and generating a fractional encoded bitstream corresponding to said fractional portions of the bit planes.

* * * * *